United States Patent
Kelley et al.

(10) Patent No.: US 11,467,937 B2
(45) Date of Patent: Oct. 11, 2022

(54) CONFIGURING CACHE POLICIES FOR A CACHE BASED ON COMBINED CACHE POLICY TESTING

(71) Applicant: Advanced Micro Devices, Inc., Santa Clara, CA (US)

(72) Inventors: John Kelley, Fort Collins, CO (US); Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 223 days.

(21) Appl. No.: 17/004,589

(22) Filed: Aug. 27, 2020

(65) Prior Publication Data

US 2021/0406145 A1 Dec. 30, 2021

Related U.S. Application Data

(60) Provisional application No. 63/044,722, filed on Jun. 26, 2020.

(51) Int. Cl.
| | |
|---|---|
| *G06F 11/30* | (2006.01) |
| *G06F 11/34* | (2006.01) |
| *G06F 12/0804* | (2016.01) |
| *G06F 12/0891* | (2016.01) |
| *G06F 11/07* | (2006.01) |

(52) U.S. Cl.
CPC ........ *G06F 11/3037* (2013.01); *G06F 11/076* (2013.01); *G06F 11/3409* (2013.01); *G06F 12/0804* (2013.01); *G06F 12/0891* (2013.01)

(58) Field of Classification Search
CPC ............... G06F 11/3037; G06F 11/076; G06F 11/3409; G06F 12/0804; G06F 12/0891; G06F 2201/81; G06F 2201/88; G06F 11/3466; G06F 12/0846; G06F 12/0895; G06F 2212/1016; G06F 2212/502; G06F 12/121; G06F 12/0811
USPC ......................................................... 714/763
See application file for complete search history.

(56) References Cited

U.S. PATENT DOCUMENTS

| | | | |
|---|---|---|---|
| 2012/0151144 A1* | 6/2012 | Yohn | G06F 12/0871 |
| | | | 711/E12.024 |
| 2015/0331803 A1* | 11/2015 | Heath | G06F 15/7821 |
| | | | 711/125 |
| 2016/0203085 A1* | 7/2016 | Kranich | G06F 9/4406 |
| | | | 711/120 |

(Continued)

*Primary Examiner* — James C Kerveros
(74) *Attorney, Agent, or Firm* — Park, Vaughan, Fleming & Dowler LLP

(57) ABSTRACT

An electronic device includes a cache with a cache controller and a cache memory. The electronic device also includes a cache policy manager. The cache policy manager causes the cache controller to use two or more cache policies for cache operations in each of multiple test regions in the cache memory, with different configuration values for the two or more cache policies being used in each test region. The cache policy manager selects a selected configuration value for at least one cache policy of the two or more cache policies based on performance metrics for cache operations while using the different configuration values for the two or more cache policies in the test regions. The cache policy manager causes the cache controller to use the selected configuration value when using the at least one cache policy for cache operations in a main region of the cache memory.

24 Claims, 10 Drawing Sheets

(56) References Cited

U.S. PATENT DOCUMENTS

2017/0262370 A1* 9/2017 Kapoor ............... G06F 12/0811
2018/0351818 A1* 12/2018 Mohanram ......... H04L 41/0895
2019/0138219 A1* 5/2019 Gschwind ........... G06F 12/1027

* cited by examiner

CONFIGURING CACHE POLICIES FOR A CACHE BASED ON COMBINED CACHE POLICY TESTING

RELATED APPLICATIONS

This application claims priority to pending U.S. provisional application No. 63/044,722, which was filed on 26 Jun. 2020, and which is incorporated by reference herein.

BACKGROUND

Related Art

Many modern electronic devices include processors (e.g., central processing units, graphics processing units, etc.) that execute instructions in program code (e.g., applications, operating systems, etc.) that cause the processors—and thus the electronic device—to perform associated operations. In many of these electronic devices, executing instructions requires a processor to retrieve the instructions and data from a non-volatile storage such as a hard disk or high-capacity non-volatile semiconductor memory. Because retrieving instructions and data from a non-volatile storage takes a relatively long time, electronic devices commonly also include a volatile memory, sometimes called a "main memory," into which copies of instructions and data are loaded (e.g., in 4 kB pages, etc.) to enable quicker retrieval of instructions and data by processors. Although retrieving instructions and data from a volatile memory can be significantly faster than from a non-volatile memory, retrieving instructions and data from a volatile memory takes a sufficiently long time that processors are regularly forced to wait for requested instructions and data to be returned from the memory. Electronic devices therefore often include faster-access cache memories (or, more simply, "caches") that are used for storing a limited number of copies of instructions and/or data for processors. For example, some electronic devices include a hierarchy of caches that includes a 64 kB level one (L1) cache as the highest and fastest to access cache in the hierarchy, a 512 kB level two (L2) cache intermediate in the hierarchy, and a 2 MB level three (L3) cache lowest and slowest to access cache in the hierarchy. Because instructions and/or data can be retrieved from caches in a fraction of the time required for retrieving instructions and/or data from the volatile memory, caches can provide a considerable boost to the performance of processors.

Because caches only store a limited number of copies of instructions and/or data, it is common for caches to become full of copies of instructions and/or data during operation. When a cache becomes full of copies of instructions and/or data, in order to store any further copies of instructions and/or data in the cache, existing copies of instructions and/or data stored in the cache must be evicted (or simply overwritten). Because decisions about storing (or not) copies of instructions and/or data in caches and which copies of instructions and/or data are evicted can have a marked impact on the performance of the caches—and thus the processors that rely on the caches—caches are typically managed in accordance with one or more cache policies. Cache policies are, or include, rules, guidelines, specifications, and/or controls on when, which, how, and/or where copies of instructions and/or data are stored, accessed, evicted/replaced, and/or otherwise interacted with in a cache and/or in caches in a hierarchy of caches. For example, cache policies may dictate which and when copies of instructions and/or data are stored in a given cache, which and when copies of instructions and/or data are to be written back to lower level caches, and which and when copies of instructions and/or data are to be evicted to make space for incoming copies of instructions and/or data, etc.

In some electronic devices, a cache controller (or other functional block) determines which cache policies are to be used and/or how the cache policies are to be configured for one or more caches. In order to determine the cache policies to be used and/or the configurations thereof, some cache controllers test the performance of individual cache policies in caches. For example, when testing a given cache policy, a cache controller can perform cache operations (e.g., storing copies of data and/or instructions, accessing copies of data and/or instructions, etc.) in the cache using the given cache policy and/or configurations thereof. While performing the cache operations, the cache controller records information such as cache access misses (or hits), eviction rates, latency of operations, etc. The cache controller then uses the recorded information to determine whether the given cache policy is to be used and/or how the cache policy is to be configured for subsequent cache operations in the cache.

Although testing cache policies and/or configurations thereof can be helpful for determining cache policies and/or configurations thereof to be used in caches, in some cases, the testing does not adequately represent the performance of the caches given the use of the cache policies and/or configurations thereof. For example, a combination of two or more cache policies (e.g., replacement and write back/write through policies, etc.) and/or configurations thereof may be simultaneously in use in caches. In such a situation, the above-described testing of individual cache policies and/or configurations thereof can provide a characterization of cache performance that is not representative of actual cache performance due to the interaction of the combination of the two or more cache policies and/or configurations thereof.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry of a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Cache Policies

Figure 1:
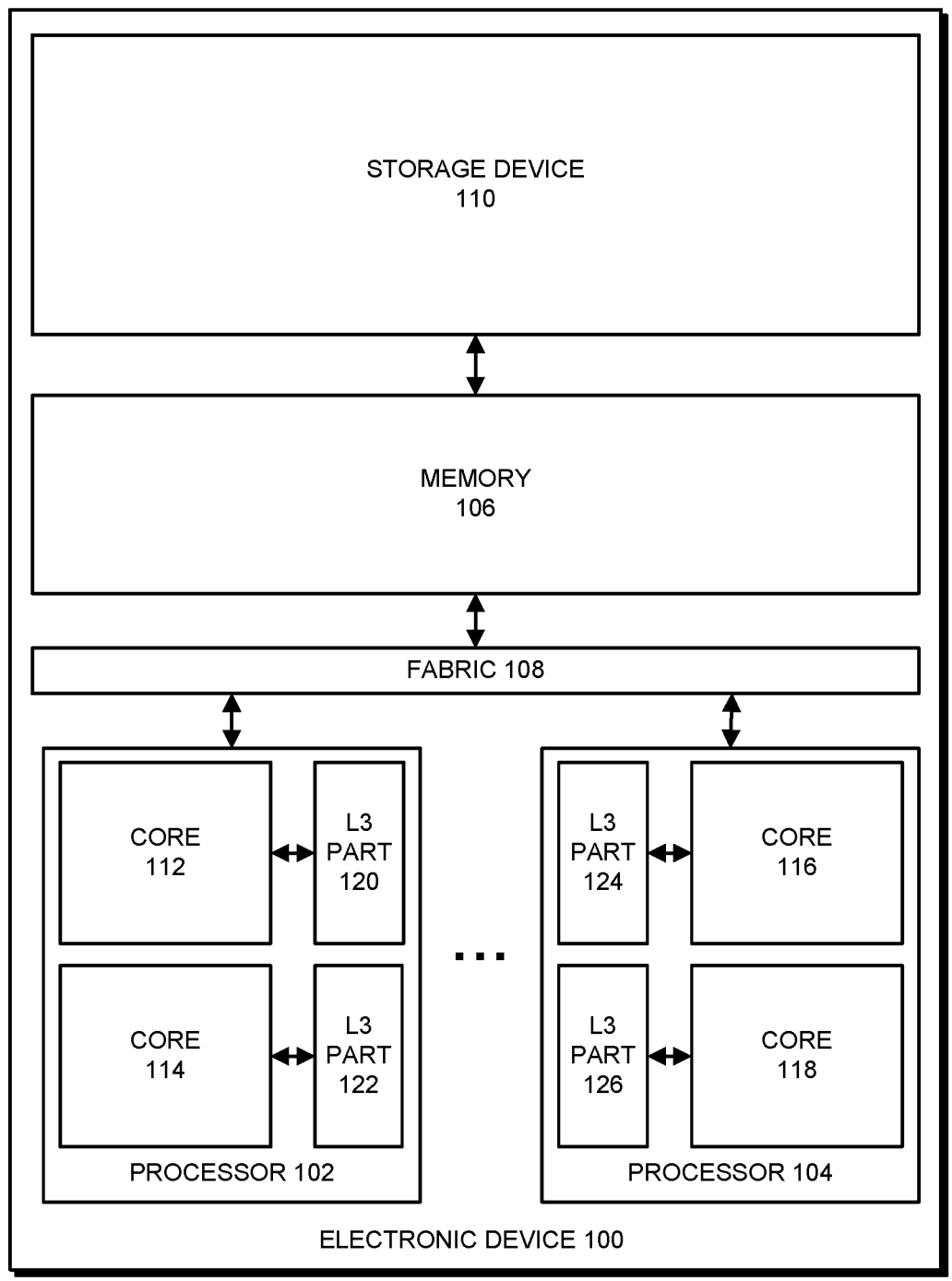
FIG. 1 presents a block diagram illustrating an electronic device in accordance with some embodiments.

In the described embodiments, cache policies are used for controlling the operation of one or more caches (e.g., L1 instruction cache 202, L1 data cache 204, L2 cache 206, and/or L3 cache parts 120-126 in FIG. 1) in an electronic device (e.g., electronic device 100 in FIG. 1). Generally, cache policies can be or include rules, guidelines, specifications, and/or controls on when, which, how, where, etc. copies of instructions and/or data are stored, accessed, evicted/replaced, and/or otherwise interacted with in a cache and/or in caches in a hierarchy of caches. For example, in some embodiments, a cache policy controls when copies of instructions and/or data are stored (or not) in a cache or particular cache(s) among a hierarchy of caches. For instance, whether copies of specified instructions and/or data (e.g., prefetched, demand fetched, from particular sources, from specified address ranges, of particular types, etc.) are stored in a cache or particular cache(s) in the hierarchy of caches. As another example, in some embodiments, a cache policy controls the eviction/replacement of copies of instructions and/or data with incoming copies of instructions and/or data. For instance, the cache policy may dictate that copies of instructions and/or data that are least recently used (i.e., accessed) from among specified sets or groups of copies of instructions and/or data in the cache are evicted/replaced first. As yet another example, in some embodiments, a cache policy controls the replacement of copies of instructions and/or data with incoming copies of instructions and/or data based on predictions about which copies of instructions and/or data will be accessed in the future. In some of these embodiments, access records (e.g., counters or other values) associated with copies of instructions and/or data in the cache are kept and used for predicting copies of instructions and/or data that are likely to be accessed later in time (i.e., will not be accessed for the longest time). As yet another example, in some embodiments, a cache policy controls when modified copies of data are written back to lower level caches and/or memory, such as with a write-through or write back cache policy. As yet another example, in some embodiments, a cache policy controls where copies of instructions and/or data are stored in a cache such as by configuring an algorithm, table, or hash function used for determining a set in a given way or other location in which copies of instructions and/or data are to be stored (e.g., for skewed associativity, etc.).

In the described embodiments, some or all of the cache policies in use in a cache can be configured. Generally, configuring cache policies includes setting configuration values (e.g., enable/disable values, timers, counters, thresholds, etc.) to be used for controlling the storing and/or accessing of copies of instructions and/or data in accordance with the cache policies. For example, in some embodiments, one or more configuration values control what copies of instructions and/or data are stored (or not) in a cache or particular cache(s) among a hierarchy of caches in accordance with a cache policy. As another example, in some embodiments, one or more configuration values control which replacement cache policy is in use in some or all of the caches. As yet another example, in some embodiments, a configuration value is or includes a counter or a timer, or a threshold for the counter or timer, that is used in a predictive replacement cache policy. In some embodiments, "configuring" a cache policy involves disabling or otherwise preventing the cache policy from being used—or, in contrast, enabling the cache policy.

Cache policies are used by cache controllers in caches (and possibly other functional blocks) for determining when, which, how, where, etc. copies of instructions and/or data are stored, accessed, evicted/replaced, and/or otherwise interacted with in a cache and/or in caches in a hierarchy of caches. For example, in some embodiments, a cache controller includes circuitry for implementing (i.e., enabling/disabling, using, etc.) each or one or more cache policies, circuitry for holding configuration values for configuring the cache policies, etc.

Overview

In the described embodiments, an electronic device includes a processor (e.g., a central processing unit, graphics processing unit, etc.) having processing circuitry (e.g., cores, instruction execution pipelines, compute units, etc.) that executes program code instructions and performs other operations. The processor includes a cache memory, or, more simply, a "cache," that stores copies of instructions and/or data for rapid retrieval for use in instruction execution or other operations in the processor. For example, in some embodiments, the cache is an instruction cache for storing copies of instructions, a data cache for storing copies of data (e.g., input data for instructions, results of prior instruction execution, constant values, etc.), or a combined cache for storing copies of instructions and data. In some embodiments, the cache is a cache in a hierarchy of two or more caches, such as a level two (L2) cache in a hierarchy of caches that includes the L2 cache and one or more level one (L1) caches.

In the described embodiments, the electronic device includes a cache policy manager that performs operations for configuring cache policies that are used in the cache. As described above, each cache policy includes one or more rules, guidelines, specifications, etc. to be used by a cache controller in the cache for controlling various aspects of storing, accessing, etc. copies of instructions and/or data in the cache. The cache policy manager configures the cache policies in use in the cache by causing the cache controller to use given cache policies and/or setting configuration values for the given cache policies. For example, in some embodiments, the cache policy manager causes the cache controller to use a storage cache policy that dictates which types of data are to be stored in the cache, e.g., prefetched, demand fetched, etc., and/or configures the storage cache policy so that specified types of data are (or are not) to be stored in the cache.

In the described embodiments, the cache policy manager performs operations for testing combinations of two or more cache policies to determine configurations of cache policies to be used in the cache. Generally, for testing the combinations of two or more cache policies, the cache policy manager causes the cache controller to perform cache operations (e.g., storing copies of instructions and/or data in the cache, replacing copies of instructions and/or data in the cache, etc.) using different configurations of the combinations of two or more cache policies being tested. While the cache controller performs cache operations using each of the configurations of the combination of the two or more cache policies, the cache policy manager monitors performance metrics associated with the cache operations. The cache policy manager then selects a configuration of the combination of the two or more cache policies to be used in the cache based on the performance metrics. For example, the cache policy manager can, based on performance metrics such as misses encountered in the cache for each tested configuration of the two or more cache policies, select a configuration of the two or more cache policies to be used for subsequent cache operations in the cache that best meets a performance metric threshold (e.g., least misses, etc.). In this way, the cache policy manager tests the separate configurations of the combination of the two or more cache policies—which reflect the constituent cache policy's interactions with and effects on one another—to find the configuration of the combination of two or more cache policies best meets performance goals, so that a "most desirable" configuration of the combination of the two or more cache policies can be used in the cache.

In some embodiments, test regions in the cache are used for the above-described testing of the combinations of cache policies. Generally, a test region includes a block, portion, or section of memory circuitry in the cache that is used for performing cache operations using a given configuration of a combination of two or more cache policies being tested. In some embodiments, the testing of two or more configurations of combinations of two or more cache policies is performed simultaneously in separate test regions in the cache, possibly with a separate test region being used for each available configuration of the combination of two or more cache policies. For example, assuming that each of cache policies A and B (e.g., a write-through policy and a replacement policy, etc.) can each be used in a first configuration (0) or a second configuration (1), four separate test regions can be used to test the following configurations of the combination of cache policies A and B: 00, 01, 10, and 11.

In some embodiments, the cache is divided into a number of test regions and a "main" region, with the test regions being, e.g., an order of magnitude or more smaller than the main region. For example, the above-described four test regions may be 50 kB in a 2 MB cache, so that the main region is 1.8 MB. In these embodiments, each configuration of a combination of two or more cache policies is tested via cache operations in a relatively small region of the cache, with a "most desirable" configuration of the combination of the two or more cache policies (i.e., a configuration of the combination of the two or more cache policies that best meets a performance metric target) being selected to be used in the larger main region of the cache.

In some embodiments, the test regions are only temporarily used for testing configurations of the combination of two or more cache policies before being returned to the main region. In other words, the test regions are identified/selected, used for testing configurations of the two or more cache policies, and then returned to the main region to be used for typical cache operations (and thus are at least temporarily no longer used for testing). The test regions may be established, used, and returned in this way a number of times for testing configurations of two or more cache policies, such as every N seconds, periodically, when an event happens, etc. In some embodiments, however, the testing is carried on substantially continuously in the test regions to enable the cache policy manager to react to changing cache operation characteristics. In other words, in these embodiments, the test regions persist beyond an initial selection of a configuration for the combination of two or more cache policies—and may be used many times over for testing configurations of the combination of the two or more cache policies.

In some embodiments, for using the above-described test regions, the cache policy manager causes (i.e., commands, requests, etc.) the cache controller in the cache to use a different configuration of a combination of two or more cache policies for performing cache operations in each of multiple test regions in the cache. Continuing the A and B cache policy example above, for this operation, in some embodiments, the cache policy manager causes the cache controller to use the 00, 01, 10, and 11 configurations of cache policies A and B in four separate test regions simultaneously. The cache policy manager then selects a selected configuration value for at least one cache policy of the two or more cache policies based on performance metrics for cache operations while using the different configuration values for the two or more cache policies in the test region(s). Again continuing the A and B cache policy example, assuming that a number of cache misses (or other performance metric) is closest to a performance metric threshold (e.g., zero) for the 10 configuration of cache policies A and B, the cache policy manager can select a selected configuration value from among the configuration values for the 1 configuration for cache policy A and/or the 0 configuration for cache policy B. The cache policy manager then causes the cache controller to use the selected configuration value when using the at least one cache policy for cache operations in a main region of the cache. Continuing the A and B cache policy example, the cache policy manager causes (i.e., commands, requests, etc.) the cache controller to set configuration value(s) for cache policies A and/or B in the main region to the selected configuration value from among the configuration values for the 1 configuration for cache policy A and/or the 0 configuration for cache policy B. This operation may include causing the cache controller to commence using cache policies A and/or B if cache policies A and/or B are not already in use in the main region.

In some embodiments, the cache policy manager uses the above-described test regions to perform per-configuration-value, or hierarchical, testing of combinations of two or more cache policies. In these embodiments, a combination of two or more cache policies is used for performing cache operations in each of multiple test regions in a cache, with different configuration values being used for the combination of two or more cache policies in each test region. The cache policy manager divides the test regions into competing groups of test regions based on the configuration values that are in use in each test region and collects performance metrics that represent the relative performance of the groups of test regions in each competing group of test regions, as well as in each test region alone. The cache policy manager then uses the performance metrics for a hierarchical testing scheme in which a number of "levels" (i.e., sets, etc.) of the competing groups of test regions and test regions alone are used to determine a winning test region, where the "winning" test regions best meets performance metric targets (e.g., a target for number of misses, etc.). The cache policy manager then selects a selected configuration value for at least one cache policy of the two or more cache policies based on the configuration values that were used for the winning test region and causes the cache controller to use the selected configuration value when using the two or more cache policies for cache operations in a main region of the cache.

In some embodiments, the cache policy manager uses the above-described test regions to perform one-versus-many testing of the configurations of the combination of two or more cache policies. In these embodiments, a combination of two or more cache policies is used for performing cache operations in each of multiple test regions in a cache, with different configuration values being used for the combination of two or more cache policies in each test region. The cache policy manager divides the test regions into competing groups of test regions so that each competing group of test regions has one test region versus all other test regions—with each test region having a respective configuration of the combination of the two or more cache policies. The cache policy manager collects performance metrics for the competing groups of test regions and uses the collected performance metrics to determine a "winning" competing group of test regions that best meets a group performance metric target. The cache policy manager then selects a selected configuration value for at least one cache policy of the two or more cache policies based on the configuration values that were used for the individual test region in the winning competing group of test regions and causes the cache controller to use the selected configuration value when using the two or more cache policies for cache operations in a main region of the cache.

In some embodiments, the cache policy manager uses the above-described test regions to perform per-region testing of the configurations of the combination of two or more cache policies. In these embodiments, a combination of two or more cache policies is used for performing cache operations in each of multiple test regions in a cache, with different configuration values being used for the combination of two or more cache policies in each test region. The cache policy manager collects performance metrics separately for each of the test regions and uses the collected performance metrics to determine a "winning" test region from among the test regions that best meets a group performance metric target. The cache policy manager then selects a selected configuration value for at least one cache policy of the two or more cache policies based on the configuration values that were used for the winning test region and causes the cache controller to use the selected configuration value when using the two or more cache policies for cache operations in a main region of the cache.

By performing the above-described testing of configurations of the combination of two or more cache policies, the described embodiments account for the effects of cache policies on one another during cache operations. In contrast to existing systems, in which cache policies are tested alone, the described embodiments can better identify combinations of cache policies that lead to more efficient operation of the cache (e.g., lowered misses in the cache, better retention of useful copies of instructions and/or data, etc.). Because storing and accessing copies of instructions and/or data in memory is a significant performance bottleneck for processors in the electronic device, improved operation of the cache (which avoids the need for storing and accessing copies of instructions and/or data in the memory) can lead to improved performance of the processors. Improved performance of the processors in turn leads to improved performance of the electronic device and increased user satisfaction.

Electronic Device

FIG. 1 presents a block diagram illustrating electronic device 100 in accordance with some embodiments. As can be seen in FIG. 1, electronic device 100 includes processors 102 and 104, memory 106, and fabric 108. Processors 102 and 104, memory 106, and fabric 108 are all implemented in "hardware," i.e., using corresponding circuitry. For example, in some embodiments, processors 102 and 104, memory 106, and fabric 108 are entirely fabricated in integrated circuitry on one or more semiconductor chips, possibly on one or more separate semiconductor chips, are fashioned from semiconductor chips in combination with discrete circuitry, or are fabricated from discrete circuitry alone. Electronic device 100 also includes storage device 110, which is a functional block, device, and/or element that includes a higher-capacity non-volatile memory for storing instructions and data for use by other functional blocks in electronic device 100. For example, storage device 110 can be or include one or more hard disks, optical disks, magnetic tapes, non-volatile semiconductor memories, etc. Each of these functional blocks and/or devices may include associated firmware and/or software as understood by one of ordinary skill in the art.

Processors 102 and 104 are functional blocks that perform computational, memory access, and other operations (e.g., control operations, configuration operations, etc.) in electronic device 100. For example, processors 102 and 104 can be or include one or more central processing units (CPUs), graphics processing units (GPUs), application specific integrated circuits (ASICs), field programmable gate arrays (FPGAs), and/or other processing mechanisms. Processors 102 and 104 include cores 112-114 and 116-118, respectively, which are each a functional block such as a CPU core, a GPU core, an ASIC, an FPGA, etc. that performs computational, memory access, and other operations in the respective processor. Processors 102-104 also include level three (L3) cache parts (L3 PART) 120-122 and 124-126, respectively, which are each a cache memory functional block that includes memory circuitry such as static random access memory (SRAM) memory circuitry for storing copies of instructions and data, and control circuitry for storing the copies of the instructions and data in the memory circuitry, accessing stored copies of instructions and data, etc.

In some embodiments, L3 cache parts 120-126 are shared among cores 112-118, and therefore the memory circuitry in each of L3 cache parts 120-126 can be used for storing copies of instructions and data from any of cores 112-118 (although possibly with preference for storing copies of instructions and data in a "local" L3 cache part such as L3 cache part 120 for core 112, etc.) and/or the instructions and data stored in L3 cache parts 120-126 can be accessed by any of cores 112-118. In these embodiments, L3 cache parts 120-126 can be considered as a group form a shared L3 cache in electronic device 100.

Memory 106 is functional block that performs operations of a memory (e.g., a "main" memory) in electronic device 100. Memory 106 includes volatile memory circuitry such as fourth-generation double data rate synchronous DRAM (DDR4 SDRAM) memory circuitry for storing copies of instructions and data for use by the other functional blocks in electronic device 100 and control circuitry for storing, accessing, etc. copies of instructions and data in the memory circuitry and for performing other control or configuration operations. In some embodiments, copies of instructions and data are retrieved (e.g., in 4 kB blocks or "pages") from storage device 110 and stored in memory 106 for use by various functional blocks in electronic device 100.

Fabric 108 is a functional block that includes communication routes that are used for communicating instructions, data, control signals, and/or other information between functional blocks (e.g., processor 102, memory 106, etc.) in electronic device 100. Fabric 108 includes one or more serial or parallel buses (e.g., wires, guides, etc.) and circuitry (e.g., transmitters, receivers, buffers, repeaters, optical elements, etc.) that are used for communicating the instructions, data, etc. between the functional blocks. In some embodiments, communication traffic (e.g., packets, signals, messages, etc.) communicated between functional blocks using fabric 108 is arranged, formatted, and handled in accordance with one or more protocols or standards such as the Infinity Fabric standard from Advanced Micro Devices, Inc. of Santa Clara, Calif.

Electronic device 100 is simplified for illustrative purposes. In some embodiments, however, electronic device 100 includes additional or different functional blocks, subsystems, and/or elements. For example, electronic device 100 may include display subsystems, power subsystems, input-output (I/O) subsystems, etc. In addition, although electronic device 100 is shown with certain functional blocks and elements, in some embodiments, electronic device 100 includes different functional blocks or elements. For example, in some embodiments, electronic device 100 includes a different number of processors (as shown using the ellipsis in FIG. 1), from one processor to many processors. As another example, although L3 cache parts 120-126 are shown in FIG. 1, in some embodiments, there is no L3 cache or the L3 cache is organized differently (e.g., not split into parts). As yet another example, in some embodiments, electronic device 100 is arranged with multiple memory parts (instead of one memory 106 as shown in FIG. 1), such as with memory parts associated with individual processors in a non-uniform memory access (NUMA) arrangement, etc. Generally, in the described embodiments, electronic device 100 includes sufficient functional blocks and elements to perform the operations described herein.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Processor

Figure 2:
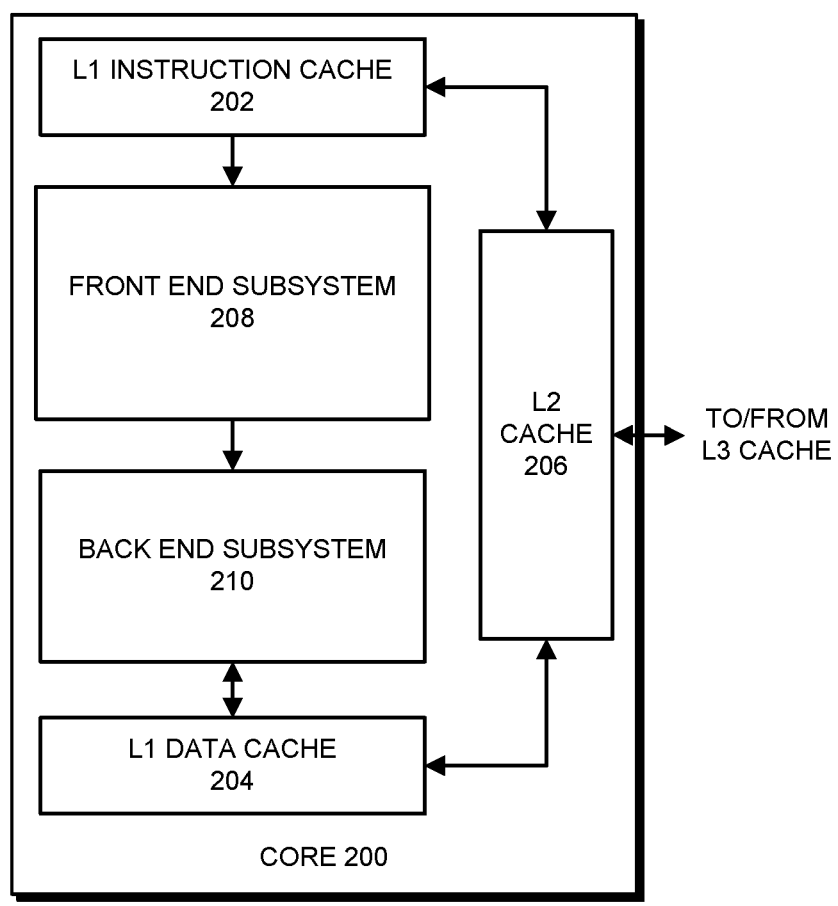
FIG. 2 presents a block diagram illustrating a core in accordance with some embodiments.

As described above, processors 102-104 include cores 112-114 and 116-118, respectively. FIG. 2 presents a block diagram illustrating core 200 in accordance with some embodiments. In some embodiments, some or all of cores 112-114 and 116-118 include similar functional blocks to those shown in core 200, i.e., are internally arranged similarly to core 200.

As shown in FIG. 2, core 200 includes level one (L1) instruction cache 202, L1 data cache 204, and level two (L2) cache 206. Each of L1 instruction cache 202, L1 data cache 204, and L2 cache 206 is a cache memory functional block that includes memory circuitry (e.g., SRAM memory circuitry, etc.) that is used for storing copies of instructions and/or data for use in front end subsystem 208 and/or back end subsystem 210 and control circuitry for controlling the storage of copies of instructions and/or data in the memory circuitry, accessing stored copies of instructions and data stored in the memory circuitry, etc. In some embodiments, L1 instruction cache 202 is used exclusively for storing copies of instructions that can be fetched for execution by front end subsystem 208 and L1 data cache 204 is used exclusively for storing copies of data (e.g., input data for instructions, results of prior instruction execution, constant values, etc.) that can be acquired from L1 data cache 204 or stored to data cache 204 by back end subsystem 210. In some embodiments, L2 cache 206 can store copies of both instructions and data.

In some embodiments, L1 instruction cache 202, L1 data cache 204, and L2 cache 206 are part of a "hierarchy" of cache memories in core 200. L1 caches 202 and 204 are the first level in the hierarchy (thus the "level one" label) and the fastest to access by the circuitry in front end subsystem 208 or back end subsystem 210, respectively, but are lower capacity than L2 cache 206. L2 cache 206 is the second level in the hierarchy and is slower to access by the circuitry in front end subsystem 208 or back end subsystem 210, but is higher capacity than L1 instruction cache 202 and L1 data cache 204. For example, in some embodiments, L1 instruction cache 202 and L1 data cache 204 are 32 kB and L2 cache 206 is 512 kB. In some embodiments, an L3 cache (e.g., some or all of L3 cache parts 120-126) is included in the hierarchy as the largest capacity cache, e.g., 16 MB, but is the slowest to access. Within the hierarchy of cache memories, the L1 caches (i.e., L1 instruction cache 202 and L1 data cache 204) are considered to be in a "highest" level of the hierarchy, L2 cache 206 is considered to be one level "lower" in the hierarchy than the L1 caches, and the L3 cache is a "lowest" level of the hierarchy.

Front end subsystem 208 includes functional blocks that perform operations for acquiring instructions from L1 instruction cache 202 (or, if necessary, L2 cache 206, the L3 cache, memory 106, or storage device 110) and generating micro-operations from the instructions that are sent to execution units in back end subsystem 210 for execution. For example, in some embodiments, front end subsystem 208 includes some or all of an instruction fetch/decode functional block, a program counter computation functional block, a branch prediction functional block, a micro-operation cache functional block, a micro-operation dispatch functional block, etc. Back end subsystem 210 includes functional blocks that perform operations for executing micro-operations received from front end subsystem 208. For example, in some embodiments, back end subsystem 210 includes some or all of an integer execution functional block, a floating point functional block, an address computation functional block, an instruction retirement functional block, etc.

In some embodiments, L1 instruction cache 202, L1 data cache 204, and L2 cache 206, front end subsystem 208, and back end subsystem 210 (and their constituent functional blocks) are implemented in "hardware," i.e., using corresponding circuitry. For example, in some embodiments, L1 instruction cache 202, L1 data cache 204, and L2 cache 206, front end subsystem 208, and back end subsystem 210 (and their constituent functional blocks) are entirely fabricated in integrated circuitry on one or more semiconductor chips, possibly on one or more separate semiconductor chips, are fashioned from semiconductor chips in combination with discrete circuitry, or are fabricated from discrete circuitry alone.

Although a particular arrangement, connectivity, and number of elements is shown in core 200 in FIG. 2, in some embodiments, different arrangements, connectivity, and/or numbers of elements are present in core 200. Generally, core 200 includes sufficient elements to perform the operations described herein.

Cache Policy Manager

Figure 3:
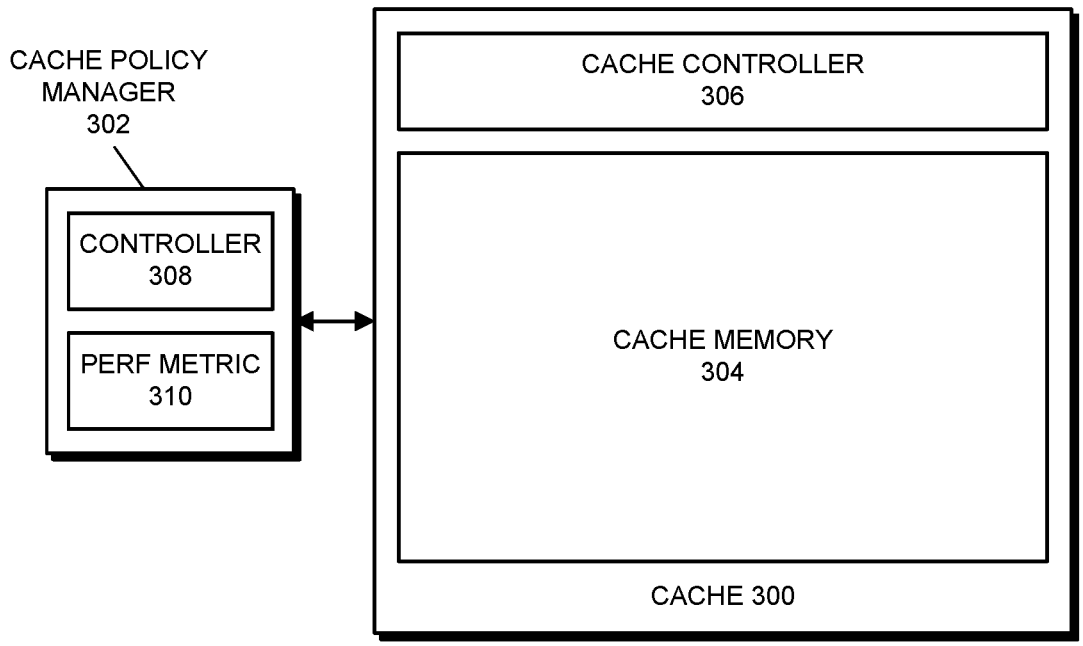
FIG. 3 presents a block diagram illustrating a cache policy manager and a cache in accordance with some embodiments.

In the described embodiments, a cache policy manager performs operations for configuring cache policies to be used in one or more caches (e.g., L1 instruction cache 202, L1 data cache 204, L2 cache 206, and/or L3 cache parts 120-126) in an electronic device (e.g., electronic device 100). FIG. 3 presents a block diagram illustrating cache 300 and cache policy manager 302 in accordance with some embodiments. As can be seen in FIG. 3, cache 300 includes cache memory 304 and cache controller 306. Cache memory 304 is a functional block that includes memory circuitry (e.g., SRAM memory circuitry, etc.) that is used for storing and accessing (e.g., reading, evicting, modifying, etc.) copies of instructions and/or data in cache blocks. "Cache blocks," as used herein, are portions of the memory circuitry in cache memory 304, such as N-byte cache lines or portions or combinations thereof, where N=64, 128, or another number. For storing copies of instructions or data in cache memory 304, blocks, portions, or chunks (e.g., 10 bytes, 64 bytes, etc.) of copies of instructions or data are acquired from a core (e.g., core 112, core 114, etc.), a lower cache memory, a memory (e.g., memory 106), a storage device (e.g., storage device 110), or another source and stored in cache blocks in cache memory 304. For accessing copies of instructions or data in cache memory 304, blocks, portions, or chunks (e.g., 10 bytes, 64 bytes, etc.) of copies of instructions or data are accessed in cache blocks in cache memory 304 (e.g., are read from the cache block in cache memory 304, etc.).

In some embodiments, cache memory 304 is organized so that cache blocks can be used for storing copies of instructions and/or data from among a range of different memory addresses. In other words, cache blocks are not reserved for storing copies of instructions and/or data from specific individual addresses in memory, but instead can be used for storing copies of instructions and/or data from multiple addresses in memory. For example, in some embodiments, cache memory is as direct mapped or associative, such as set associative, skewed associative, etc. In accordance with the mapping or associativity in use, memory circuitry in cache memory 304 can be divided into a number of sets, ways, and/or other divisions that are used for storing copies of instructions and/or data from corresponding addresses in memory. For example, in some embodiments, cache memory 304 is set associative and memory circuitry in cache memory 304 is divided into a number of sets and ways that are used for storing copies of instructions and/or data from specified address ranges of an address space in use in electronic device 100.

Cache controller 306 is a functional block that performs operations for managing the operation of cache 300. Among the operations performed by cache controller 306 are operations for storing copies of instructions and/or data in cache blocks in cache memory 304, searching cache memory 304 (or another functional block, such as a tag array (not shown), etc.) to determine if copies of instructions and/or data are present in cache blocks in cache memory 304, accessing copies of instructions and/or data in cache blocks in cache memory 304, maintaining copies of instructions and/or data in cache memory 304 (e.g., via periodic memory circuit refreshes or other operations), etc. In the described embodiments, cache controller 306 controls the storing of and/or accessing of copies of instructions and/or data in cache memory 304 based on or in accordance with cache policies as described herein. For example, cache controller 306 may replace/evict copies of instructions and/or data in accordance with a replacement cache policy, store (or not) particular types of copies of instructions and/or data (e.g., prefetched, demand fetched, etc.) in cache memory 304 in accordance with a storage cache policy, etc.

Cache policy manager 302 is a functional block that performs operations for configuring cache policies used by cache controller 306. Generally, for configuring cache policies, cache policy manager 302 sets configuration values for cache policies being used in cache 300. In other words, cache policy manager 302 sets configuration values to enable, disable, or otherwise control (via timer values, thresholds, counters, etc.) the cache policies in use in cache 300. For example, in some embodiments, cache policy manager 302 configures cache controller 306 to use (or not use) a specified predictive replacement policy—or sets thresholds, counter values, etc. for the predictive replacement policy. Cache controller 306 then handles (e.g., stores, accesses, etc.) copies of instructions and/or data stored in cache memory 304 in accordance with the configuration of the cache policies. Cache policy manager 302 also performs operations for testing configurations of combinations of two or more cache policies to determine how cache policies are to be configured in cache 300. Generally, cache policy manager 302 performs the testing to find a particular configuration of the combinations of two or more cache policies that best meets performance metric targets. Based on the configuration of the combination of two or more cache policies that best meets the performance metric targets, cache policy manager 302 causes cache controller 306 to use the particular configuration of the combinations of the two or more cache policies for cache operations in cache memory 304.

As can be seen in FIG. 3, cache policy manager 302 includes controller 308 and performance (PERF) metric 310. Controller 308 is a functional block that includes circuitry for performing the operations of cache policy manager 302, including configuring cache policies for cache 300, testing configurations of combinations of two or more cache policies, recording performance metrics for testing configurations of combinations of two or more cache policies, etc. Performance metrics 310 is a functional block that includes circuitry for recording/storing performance metrics for controller 308 for the testing of configurations of combinations of cache policies in cache 300. For example, performance metrics 310 may store counters and/or other values for or associated with performance metrics such as hits or misses for copies of instructions and/or data in cache memory 304.

Figure 4:
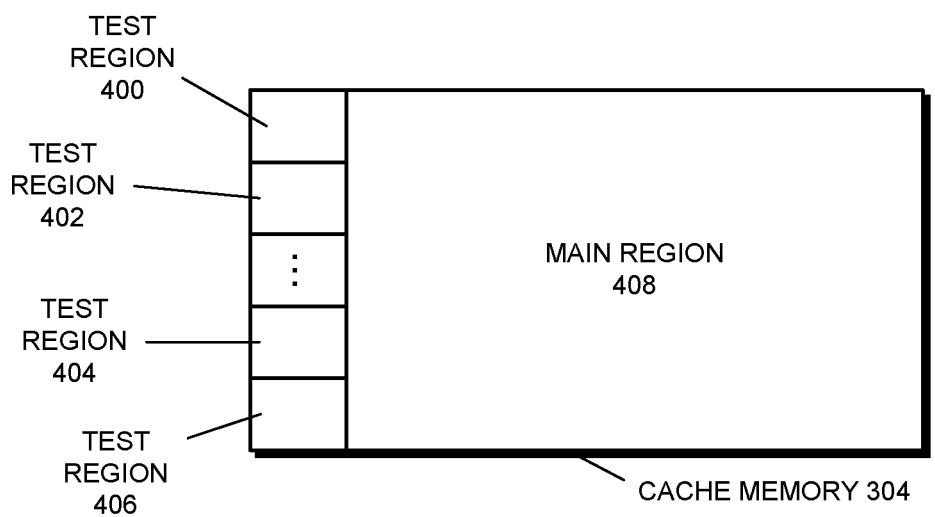
FIG. 4 presents a block diagram illustrating test regions and a main region in a cache memory in accordance with some embodiments.

In some embodiments, for the above-described testing of combinations of two or more cache policies, controller 308 uses test regions of cache memory 304 for testing different configurations of combinations of two or more cache policies. Test regions are sections or portions of cache memory 304 in which different configurations of combinations of two or more cache policies are separately tested. Performance metrics collected from or based on cache operations performed in each test region during the testing serve as examples or representations of how the configurations of the combinations of the two or more cache policies are likely to perform if subsequently used in a "main" region of cache memory 304. FIG. 4 presents a block diagram illustrating test regions 400-406 and a main region 408 in cache memory 304 in accordance with some embodiments. As can be seen in FIG. 4, each of test regions 400-406 includes a portion of the memory circuitry in cache memory 304. For example, a test region may include a specified number of cache blocks (e.g., N-byte cache lines or portions or combinations thereof), a given percentage of the cache blocks in cache memory 304 (e.g., 5%, 10%, or another percentage), etc. In some embodiments, each test region includes a relatively small part of the memory circuits in cache memory 304 in comparison to the main region. For example, in some embodiments, test regions 400-406 are each at least one order of magnitude smaller than main region 408, such as 250 kB test regions in a 4 MB cache memory 304.

In some embodiments, test regions 400-406 are used on an ongoing basis, i.e., substantially permanently, for testing configurations of combinations of two or more cache policies. In these embodiments, each of the configurations of the two or more cache policies is assigned or allocated a separate test region from among test regions 400-406 and cache operations are performed on an ongoing basis in each of the test region using the respective configuration of the two or more cache policies. Based on performance metrics collected by cache policy manager 302 while the cache operations are performed in test regions 400-406, cache policy manager 302 configures the cache policies for main region 408. For example, in some embodiments, cache policy manager 302 substantially continuously collects performance metrics (e.g., collects performance metrics at a given time interval) based on cache operations in test regions 400-406 and uses the collected performance metrics for configuring—and possibly reconfiguring—the cache policies for main region 408 when a specified event occurs, every N seconds, upon a software application or context switch, etc.

In some embodiments, cache policy manager 302 establishes and uses test regions 400-406 temporarily during a "testing" phase, but then returns test regions 400-406 to the main region 408 for operation in a "regular operating" phase. In other words, in some embodiments, during a given testing phase, cache policy manager 302 selects test regions 400-406 and then causes cache controller 306 to perform cache operations in each of test regions 400-406 using a respective configuration of two or more cache policies. When the testing is complete (e.g., when sufficient performance metrics have been collected), cache policy manager 302 causes cache controller 306 to return test regions 400-406 to main region 408 before proceeding with cache operations in main region 408. Test regions 400-406 are therefore temporarily reconfigured with respective cache policies for testing before being restored to the configuration of the two or more cache policies in use in main region 408. In some of these embodiments, cache policy manager 302 can enter the testing phase once or more times, and may repeatedly or periodically enter the testing phase. For example, cache policy manager 302 can start a testing phase when a specified event occurs, every N seconds, upon a software application or context switch, etc.

Although FIG. 4 presents a particular number and arrangement of test regions 400-406, in some embodiments a different number or arrangement of test regions may be used (as shown by the ellipsis in FIG. 4). For example, in some embodiments, the number of test regions that are used depends on the number of cache policies being tested. For instance, when three cache policies A, B, and C having configurations 0 (e.g., disabled, using first thresholds, etc.) and 1 (e.g., enabled, using second thresholds, etc.) are being tested, eight test regions can be used for separately testing configurations 000, 001, 010, 011, 100, 101, 110, and 111 of cache policies A, B, and C. As another example, in some embodiments, only a single test region is used and each configuration of the combination of cache policies being tested is separately tested in the single test region in sequence (where "testing" involves performing cache operations in the test region until sufficient performance metrics have been collected to enable a decision about a configuration of cache policies to be used in a main region of the cache). In other words, a test for a given configuration of a combination of two or more cache policies is completed in the test region and then test for a next configuration of the combination of two or more cache policies is started until all configurations of the combination of two or more cache policies have been tested.

Although test regions 400-406 are shown as being relatively small in comparison with main region 408, in some embodiments, the test region(s) are larger. For example, in some embodiments, the test regions are evenly divided among the available memory circuitry in cache memory 304—and main region is not present. In these embodiments, the test regions may be temporarily used for testing during a testing phase and then the memory circuits may be restored to main region 408.

In some embodiments, some or all of L1 instruction cache 202, L1 data cache 204, L2 cache 206, and/or L3 cache parts 120-126 include similar functional blocks to those shown in cache 300, i.e., are internally configured and arranged similarly to cache 300. In addition, in some embodiments, one or more of L1 instruction cache 202, L1 data cache 204, L2 cache 206, and/or L3 cache parts 120-126 are coupled to a respective cache policy manager in an arrangement similar to that shown in FIG. 3. In other words, each of the one or more of L1 instruction cache 202, L1 data cache 204, L2 cache 206, and/or L3 cache parts 120-126 are coupled to their own separate single-cache cache policy manager. In these embodiments, the cache policy manager configures cache policies for the respective cache alone. In some embodiments, two or more of the single-cache cache policy managers communicate and interact for configuring cache policies in their respective caches. In some embodiments, however, two or more of L1 instruction cache 202, L1 data cache 204, L2 cache 206, and/or L3 cache parts 120-126 are coupled to a single cache policy manager. For these embodiments, one cache policy manager configures the cache policies to be used in some or all of the two or more of L1 instruction cache 202, L1 data cache 204, L2 cache 206, and/or L3 cache parts 120-126. For example, in some embodiments, a single cache policy manager configures cache policies for the entire hierarchy of caches in electronic device 100—i.e., all of L1 instruction cache 202, L1 data cache 204, L2 cache 206, and/or L3 cache parts 120-126.

Process for Configuring Cache Policies in a Cache

Figure 5:
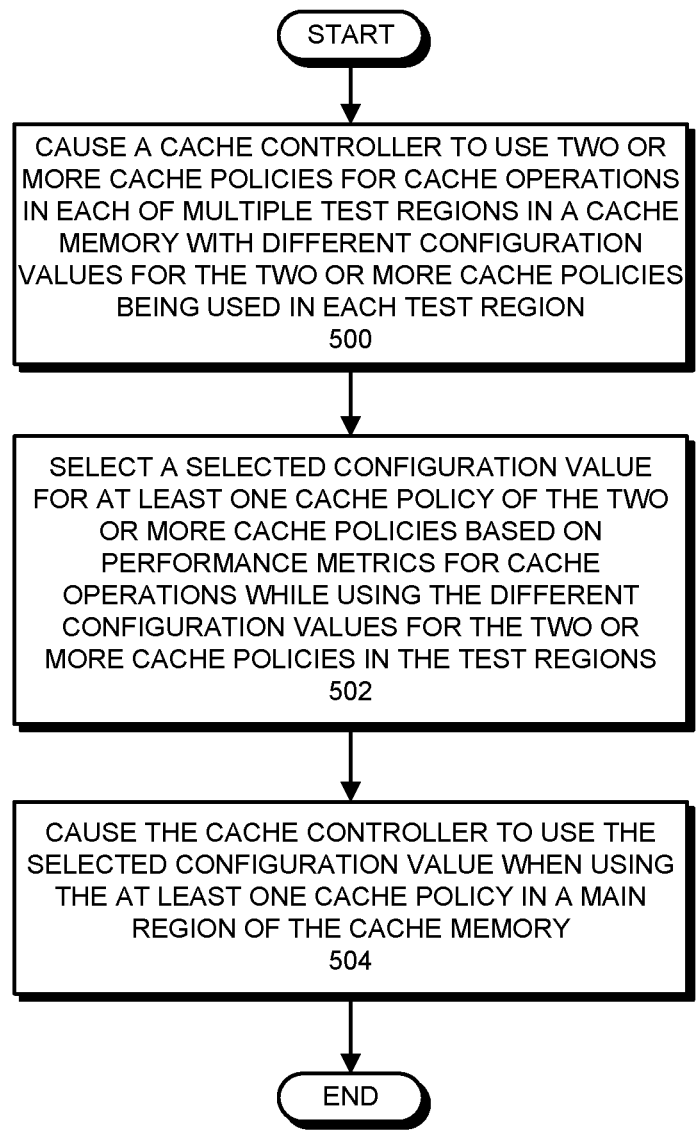
FIG. 5 presents a flowchart illustrating a process for configuring cache policies for a cache in accordance with some embodiments.

In the described embodiments, a cache policy manager (e.g., cache policy manager 302) performs operations for configuring cache policies to be used by a cache controller in a cache (e.g., cache controller 306 in cache 300) for handling storage and accesses of copies of instructions and/or data in a cache memory (e.g., cache memory 304). FIG. 5 presents a flowchart illustrating a process for configuring cache policies for a cache in accordance with some embodiments. Note that the operations shown in FIG. 5 are presented as a general example of operations performed by some embodiments. The operations performed by other embodiments include different operations, operations that are performed in a different order, and/or operations that are performed by different entities or functional blocks.

Figure 6:
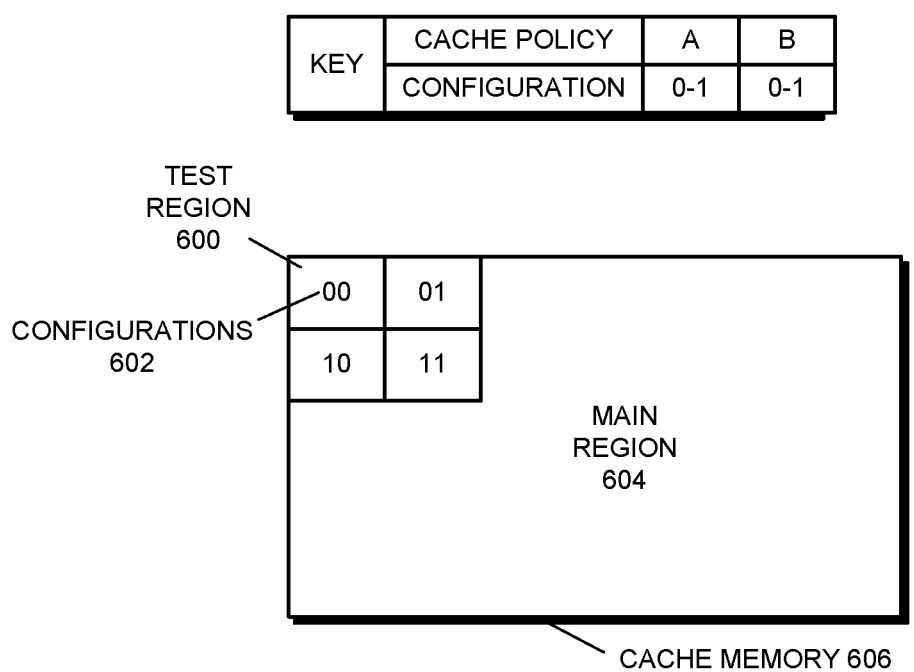
FIG. 6 presents a block diagram illustrating cache policies in use in testing regions in a cache memory in accordance with some embodiments.

The operations in FIG. 5 start when the cache policy manager causes the cache controller to use to two or more cache policies for cache operations in each of multiple test regions in a cache memory (e.g., test regions 400-406) with different configuration values for the two or more cache policies being used in each test region (step 500). For this operation, the cache policy manager causes the cache controller to use all of the two or more cache policies for cache operations (i.e., storing copies of instructions and/or data, accessing copies of instructions and/or data, etc.) in each test region, but with the combination of the two or more cache policies being configured differently in each test region. FIG. 6 presents a block diagram illustrating two cache policies (A and B) in use in testing regions in cache memory 606 (which can be similar to cache memory 304) in accordance with some embodiments. For the example in FIG. 6, cache policy A is a first cache policy (e.g., a replacement policy, etc.) and cache policy B is a second cache policy (e.g., a write through or write back policy, etc.), with cache policies A and B being configurable in first and second configurations (e.g., operating states, etc.) as shown in the key in FIG. 6 by configurations 602 of 0 and 1. For instance, cache policy A may be disabled (0) or enabled (1), may be set to use first values (e.g., counters, thresholds, etc.) (0) or second values (1), etc. Each of four test regions (only one of which is labeled for clarity) is used for performing cache operations using the combination of cache policies A and B, with test region 600 being used for the first configuration/operating state of cache policies A and B, which is shown as 00 in FIG. 6 to represent cache policies A and B having configuration values, settings, etc. that place both of cache policies A and B in a respective first configuration. The remaining test regions are used for performing cache operations using the combination of cache policies A and B having respective different configurations of cache policies A and B, which are shown as 01, 10, and 11 in FIG. 6.

Returning to FIG. 5, the cache policy manager then selects a selected configuration value for at least one cache policy of the two or more cache policies based on performance metrics for cache operations while using the different configuration values for the two or more cache policies in the test regions (step 502). For this operation, the cache policy manager keeps track of performance metrics while cache operations are performed in each of the test regions (i.e., for each of the configurations of the two or more cache policies). For example, the cache policy manager can keep track of a count of cache misses, a ratio of cache access requests to misses, a count of requests to a lower level cache memory for copies of data and/or instructions, a count of evictions of copies of instructions and/or data, and/or another metric that indicates the performance of the configuration of the two or more cache policies in the testing regions. The cache policy manager then uses the performance metrics for determining a "winning" test region, which is a test region having a respective configuration of the two or more cache policies that the corresponding performance metrics indicate is the best performing configuration of the two or more cache policies among the testing regions. For this operation, the cache policies compares the performance metrics to one or more performance metric thresholds to determine which configuration of the two or more cache policies best meets a performance metric target (e.g., using the testing operations described for FIGS. 7 or 9). The cache policy manager then selects, as the selected configuration value for the at least one cache policy, the configuration value in use in the winning test region. Continuing the A and B cache policy example above, the cache policy manager can compare performance metrics for the 00, 01, 10, and 11 configurations of cache policies A and B in the test regions (i.e., test regions 600, etc.) and/or groups thereof and select, as the "winning" test region, a test region for which the performance metrics best meets the performance metric target. For this example, it is assumed that configuration 10 best meets the performance metric target (e.g., has the least misses, etc.) and thus the cache policy manager selects, as the selected configuration value for the at least one cache policy, the configuration value in use in the winning test region—i.e., configuration value (or the underlying settings, thresholds, etc.) 1 for cache policy A and/or configuration 0 for cache policy B.

The cache policy manager then causes the cache controller to use the selected configuration value when using the at least one cache policy in a main region of the cache memory (step 504). For this operation, the cache policy manager causes (i.e., commands, requests, etc.) the cache controller to use the configuration value 1 (i.e., the respective settings, thresholds, etc.) for cache policy A and/or configuration 0 for cache policy B while using cache policies A and B for cache operations in the main region. In this way, the cache policy manager compares, using the test regions, each of the configurations of the two or more cache policies to determine a configuration of the two or more cache policies that best meets a performance goal (e.g., has the least misses, the least evictions, etc.) and uses that configuration for cache operations in the main region of the cache memory.

Process for Performing Per-Configuration-Value Testing

Figure 7:
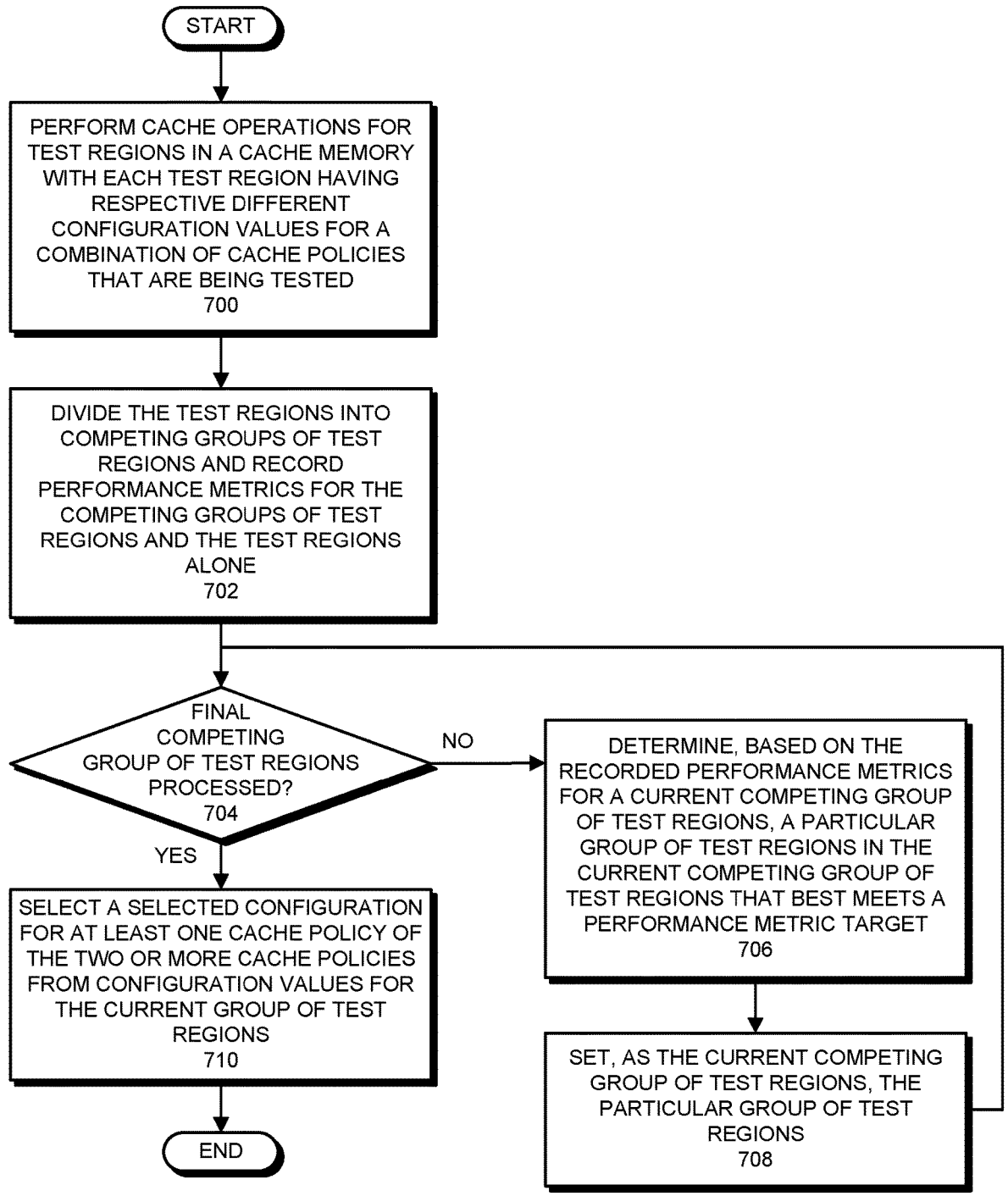
FIG. 7 presents a flowchart illustrating a process for performing per-configuration-value testing of configurations of two or more cache policies in accordance with some embodiments.

In some embodiments, a cache policy manager (e.g., cache policy manager 302) performs per-configuration-value testing of configurations of two or more cache policies. FIG. 7 presents a flowchart illustrating a process for performing per-configuration-value testing of configurations of two or more cache policies in accordance with some embodiments. Note that the operations shown in FIG. 7 are presented as a general example of operations performed by some embodiments. The operations performed by other embodiments include different operations, operations that are performed in a different order, and/or operations that are performed by different entities or functional blocks. In some embodiments, the process shown in FIG. 7 is performed as part of step 502 of FIG. 5. In these embodiments, in other words, the selected configuration value for at least one cache policy is selected using the per-configuration-value testing shown in FIG. 7.

Generally, for the per-configuration-value testing, a combination of two or more cache policies is used for performing cache operations in each of multiple test regions in a cache, with different configuration values being used for the combination of two or more cache policies in each test region. The cache policy manager divides the test regions into competing groups of test regions based on the configuration values that are in use in each test region and collects performance metrics that represent the relative performance of the groups of test regions in each competing group of test regions, as well as in each test region alone. The cache policy manager then uses the performance metrics for a hierarchical testing scheme in which a number of "levels" (i.e., sets, etc.) of the competing groups of test regions and test regions alone are used to determine a winning test region, where the "winning" test region best meets performance metric targets (e.g., a target for number of misses, etc.). The cache policy manager then selects the selected configuration value to be used for subsequent cache operations in a main region of the cache from among the configuration values for the winning test region.

For the process shown in FIG. 7, a combination of cache policies A and B (e.g., a replacement cache policy and a storage cache policy) is used as an example of a combination of cache policies being tested. In some embodiments, however, more than two cache policies are tested with the operations in FIG. 7 adjusted accordingly. For example, in some of these embodiments, testing three or more cache policies involves including an additional hierarchical test level for each additional cache policy (and thus configuration value). In addition, for the process shown in FIG. 7, it is assumed that configuration values can only have two values (e.g., 0/1, on/off, etc.) and thus there are only two competing groups at each hierarchal level—i.e., that the configurations can only be set in two ways or operating states. In some embodiments, however, some or all of the cache policies use at least some configuration values that have (can be set to, etc.) three or more values or use multiple configuration values, with the operations in FIG. 7 adjusted accordingly. For example, three or more competing groups can be included in some or all of the hierarchical test levels.

The process shown in FIG. 7 starts with a cache controller performing cache operations for test regions in a cache memory (e.g., cache memory 304), with each test region having different configuration values for a combination of two cache policies being tested (step 700). For this operation, the cache controller, possibly upon being caused by (e.g., at the request of, command of, etc.) a cache policy manager (e.g., cache policy manager 302), performs cache operations in each of the test regions such as storing copies of instructions and/or data, accessing stored copies of instructions and/or data, evicting/replacing existing stored copies of instructions and/or data with incoming copies of instructions and/or data, etc. In each test region, the cache controller performs the cache operations using a given one of two configurations for each of cache policies A and B. For example, using 0 and 1 to generally represent first and second configurations of the cache policies, cache policies A and B may be configured in four test regions such as the configurations of cache policies shown in FIG. 6. In other words, in a first test region, both cache policies A and B are set to a first configuration, represented by 00, in a second test region, cache policy A is in the first configuration and cache policy B is in the second configuration, represented by 01, in a third test region, cache policy A is in the second configuration and cache policy B is in the first configuration, represented by 10, etc.

Note that "0" and "1" as used for cache policies A and B for the example in FIG. 7 and elsewhere herein are used to identify or indicate first and second configurations for cache policies A and B, but 0 and/or 1 are not necessarily values that are actually used in configuring or testing the cache policies. In some embodiments, one or more settings, values, thresholds, counters, and/or other values may actually be set to configure cache policies A and B in the first and second configurations. For example, if cache policy A were to use a timer, configuring cache policy A in the first configuration (i.e., as shown using 0 in the examples) could mean setting the timer to a given first value and configuring cache policy A in the second configuration (i.e., as shown using 1 in the examples) could mean setting the timer to a given second value. As another example, if cache policy A were to use a data type specifier (e.g., for prefetched data, demand fetched data, etc.), configuring cache policy A in the first configuration (i.e., as shown using 0 in the examples) may mean setting the data type specifier to a given first value and configuring cache policy A in the second configuration (i.e., as shown using 1 in the examples) may mean setting the data type specifier to a given second value.

Figure 8:
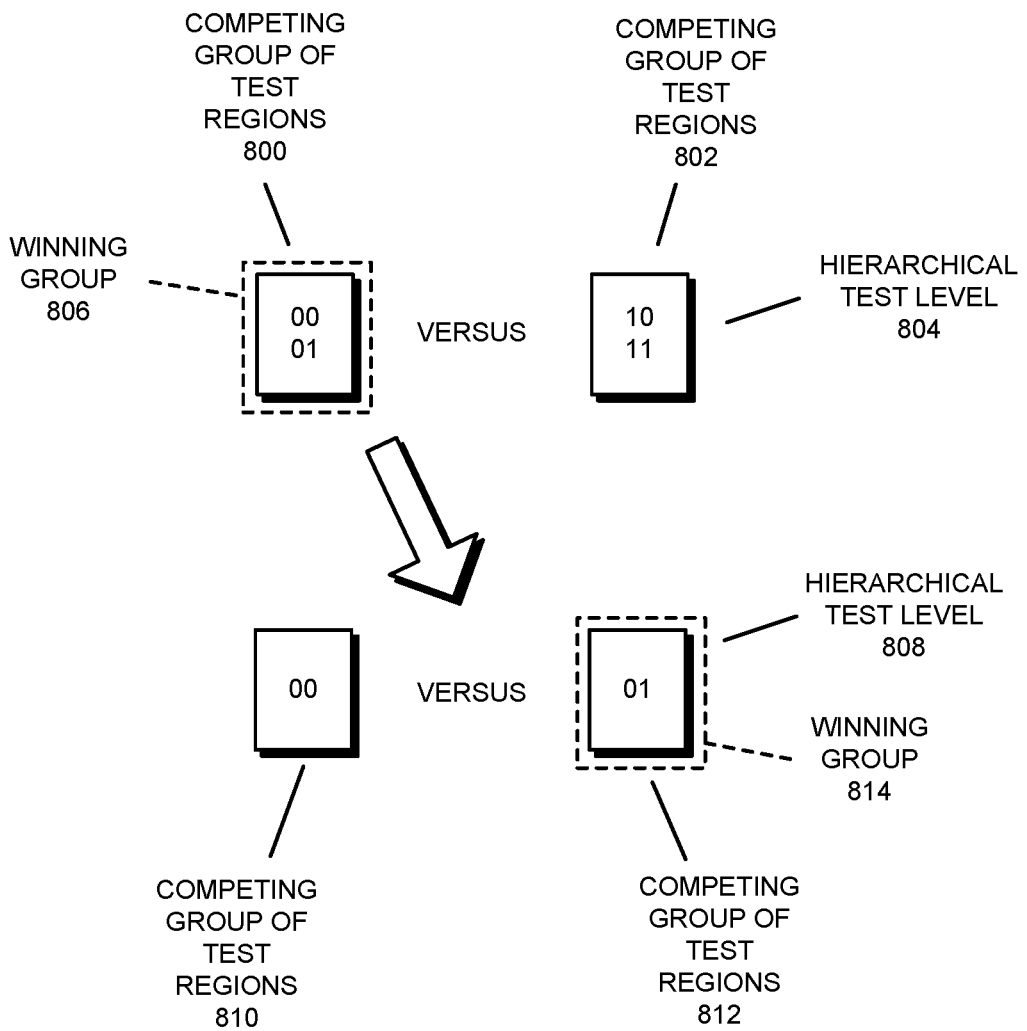
FIG. 8 presents a block diagram illustrating testing regions for per-configuration-value testing in accordance with some embodiments.

The cache policy manager divides the test regions into competing groups of test regions and records performance metrics for the competing groups of test regions and the test regions alone while performing the cache operations (step 702). For this operation, the cache policy manager divides the test regions into competing groups of test regions based at least in part on configuration values (or the particular configurations) for cache policies A and B in use in each test region. Generally, the cache policy manager divides the test regions into competing groups in which a given configuration value is the same in all of the test regions in each competing group of test regions. FIG. 8 presents a block diagram illustrating testing regions for per-configuration-value testing in accordance with some embodiments. As can be seen in FIG. 8, the four test regions are divided into two competing groups of test regions 800-802 for hierarchical test level 804 for the per-configuration-value testing. The competing groups of test regions are divided using cache policy A, so that, in competing group of test regions 800, cache policy A is in the first configuration for both of the test regions (i.e., test regions 00 and 01), and in competing group of test regions 802, cache policy A is in the second configuration for both test regions.

For recording performance metrics for competing groups of test regions 800-802 and the test regions alone, the cache policy manager records performance metrics that identify the relative performance of the configuration of cache policies A and B in the competing groups of test regions and the test regions alone. For example, in some embodiments, the cache policy manager uses a saturating push-pull counter to keep track of the misses (i.e., requests for which no copy of instructions and/or data was found in the cache) for the competing groups of test regions. In these embodiments, the cache policy manager starts the counter at an initial value and, when a miss is encountered in competing group of test regions 800, increases the counter (e.g., increments, doubles/shifts, etc.), and when a miss is encountered in competing group of test regions 802, decreases the counter (e.g., decremented, halved/shifted, etc.). The counter is therefore pushed/increased for events that occur for one competing group of test regions and pulled/decreased for events that occur for another competing group of test regions (up and down to saturating values such as 16 and 0, etc.). As another example, the cache policy manager can use a simple counter to keep track of misses that occur in the competing groups of test regions and/or each of the test regions alone. In some embodiments, the cache policy manager collects/records performance metrics for a specified amount of time (e.g., N seconds, where N is 0.5, 1, or another value), until a given number of cache operations have been performed, and/or based on one or more other time values.

After collecting the performance metrics, the cache policy manager uses the performance metrics in the hierarchical testing scheme for the competing groups of test regions and test regions alone to determine a winning group of test regions. For this operation, the cache policy manager determines whether a final competing group of test regions has been processed (step 704)—i.e., if there remain any more levels of testing to be performed. When the final competing group of test regions has not been processed (step 704), the cache policy manager determines, based on the recorded performance metrics for a current competing group of test regions, a particular group of test regions in the current group of test regions that best meets a performance metric target (step 706). In other words, for the current level of testing, the cache policy manager compares the performance of groups of test regions in a given competing group of test regions. For example, in some embodiments, the cache policy manager checks the above-described push-pull counter to determine the competing group of test regions that best meets a performance metric target such as a particular value of the push-pull counter that indicates a number of misses, etc. is lower for a given one of the competing group of test regions. FIG. 8 presents an example of a hierarchical test level 804, in which performance metric(s) for competing groups of test regions 800-802 are used to determine a winning group 806 that best meets a performance metric target. For the example in FIG. 8, the winning group 806 is competing group of test regions 800, which means that the performance metrics for competing groups of test regions 800-802 indicate that competing group of test regions 800 better met the performance metric target. The cache policy manager then sets, as the current competing group of test regions, the particular group of test regions (step 708). In this way, the test regions in the winning competing group of test regions are forwarded to a next level of the hierarchical test. This is shown in FIG. 8 via the arrow (which shows the forwarding of winning group 806).

When the testing is complete at a given level, the cache policy manager returns to step 704 to determine whether a final competing group of test regions has been processed. When the final competing group of test regions has not been processed (step 704), the cache policy manager uses the current competing group of test regions (set in step 708) in the next level of the hierarchical test. In other words, for competing groups of test regions in the current competing group of test regions (recalling that the competing groups of test regions were determined by the cache policy manager in step 702), the cache policy manager performs steps 706-708. The cache policy manager repeats this sequence of determining the winning group of test regions at each level of the hierarchy until arriving at a final level of the hierarchy in which the competing "groups" of test regions are simply one individual test region versus another individual test region. An example of the final competing group of test regions, and thus the final level of the testing hierarchy, is shown in FIG. 8 as hierarchical test level 808, in which competing groups of test regions 810-812 are tested to see which competing group of test regions best meets the performance metric target. As can be seen, competing group of test regions 812 is the winning group of test regions 814.

When the final competing group of test regions has been processed (step 704), the cache policy manager selects a selected configuration for at least one cache policy of the two or more cache policies from the configuration values for the current group of test regions (step 710). In other words, the cache policy manager uses the configuration values from the winning group of test regions at the final level of the testing hierarchy as the configuration values to be used for the main region of the cache memory. The cache policy manager then causes the cache controller to use the selected configuration value when using the at least one cache policy in a main region of the cache memory (e.g., as shown in step 504 of FIG. 5).

Process for Performing One-Versus-Many Testing

Figure 9:
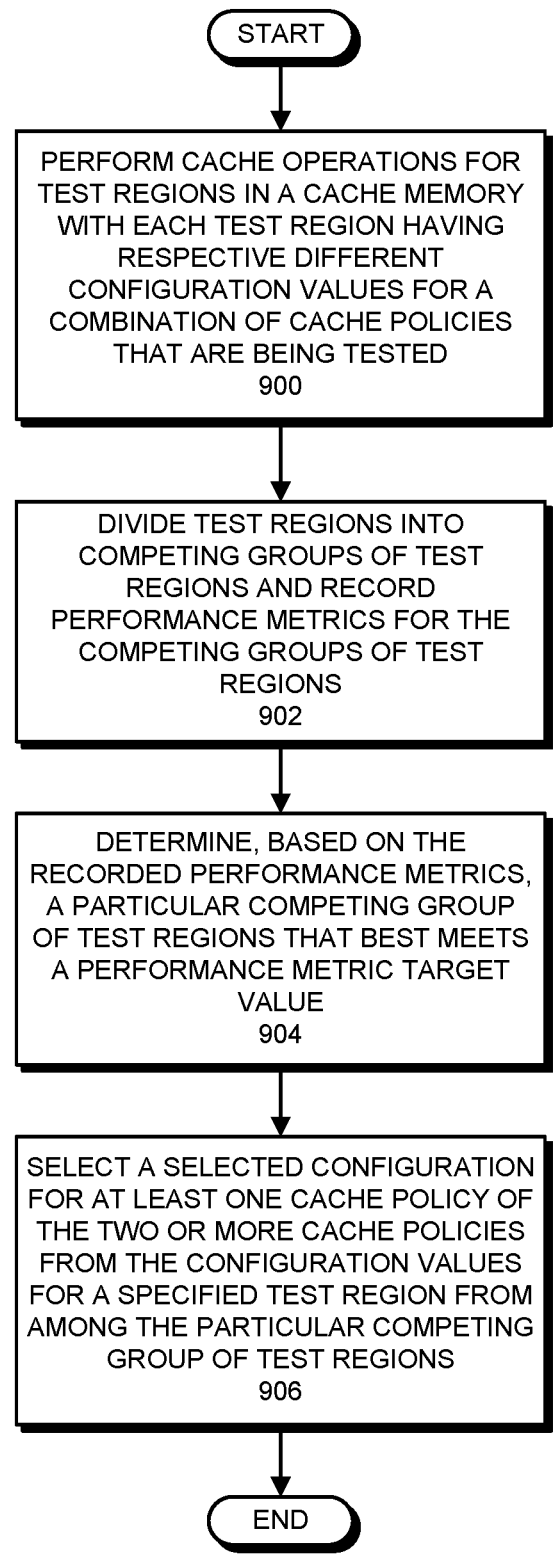
FIG. 9 presents a flowchart illustrating a process for performing one-versus-many testing of configurations of two or more cache policies in accordance with some embodiments.

In some embodiments, a cache policy manager (e.g., cache policy manager 302) performs one-versus-many testing of configurations of two or more cache policies. FIG. 9 presents a flowchart illustrating a process for performing one-versus-many testing of configurations of two or more cache policies in accordance with some embodiments. Note that the operations shown in FIG. 9 are presented as a general example of operations performed by some embodiments. The operations performed by other embodiments include different operations, operations that are performed in a different order, and/or operations that are performed by different entities or functional blocks. In some embodiments, the process shown in FIG. 9 is performed as part of step 502 of FIG. 5. In these embodiments, in other words, the selected configuration value for at least one cache policy is selected using the one-versus-many testing shown in FIG. 9.

Generally, for the one-versus many testing, a combination of two or more cache policies is used for performing cache operations in each of multiple test regions in a cache, with different configuration values being used for the combination of two or more cache policies in each test region. The cache policy manager divides the test regions into competing groups of test regions so that each competing group of test regions has one individual test region versus all of the other test regions. In other words, each competing group of test regions has a first set of test regions including a respective one of the test regions alone and a second set of test regions including the remaining test regions other than the respective one of the test regions. The cache policy manager then collects performance metrics that represent the relative performance of the groups of test regions in each competing group of test regions. The cache policy manager next uses the performance metrics for the competing groups to determine a winning competing group of test regions, where the "winning" competing group of test regions best meets performance metric targets (e.g., a target for number of misses, etc.). The selected configuration value to be used for subsequent cache operations in a main region of the cache is then selected from among the configuration values for the individual test region in the winning competing group of test regions.

For the process shown in FIG. 9, a combination of cache policies A and B (e.g., a replacement cache policy and a storage cache policy) is used as an example of a combination of cache policies being tested. In some embodiments, however, more than two cache policies are tested with the operations in FIG. 9 adjusted accordingly. For example, in some of these embodiments, testing three or more cache policies involves including additional competing groups of test regions so that every configuration of the two or more cache policies is alone in a competing group of test regions.

In addition, for the process shown in FIG. 9, it is assumed that configuration values can only have two values (e.g., 0/1, on/off, etc.)—i.e., that the configurations can only be set in two ways or operating states. In some embodiments, however, some or all of the cache policies use at least some configuration values that have (can be set to, etc.) three or more values or use multiple configuration values, with the operations in FIG. 9 adjusted accordingly.

The process shown in FIG. 9 starts with a cache controller performing cache operations for test regions in a cache memory (e.g., cache memory 304), with each test region having different configuration values for a combination of two cache policies being tested (step 900). For this operation, the cache controller, possibly upon being caused by (e.g., at the request of, command of, etc.) a cache policy manager (e.g., cache policy manager 302), performs cache operations in each of the test regions such as storing copies of instructions and/or data, accessing stored copies of instructions and/or data, evicting/replacing existing stored copies of instructions and/or data with incoming copies of instructions and/or data, etc. In each test region, the cache controller performs the cache operations using a given one of two configurations for each of cache policies A and B. For example, using 0 and 1 to generally represent first and second configurations of the cache policies, cache policies A and B may be configured in four test regions such as the configurations of cache policies shown in FIG. 6. In other words, in a first test region, both cache policies A and B are set to a first configuration, represented by 00, in a second test region, cache policy A is in the first configuration and cache policy B is in the second configuration, represented by 01, in a third test region, cache policy A is in the second configuration and cache policy B is in the first configuration, represented by 10, etc.

Note that "0" and "1" as used for cache policies A and B for the example in FIG. 9 and elsewhere herein are used to identify or indicate first and second configurations for cache policies A and B, but 0 and/or 1 are not necessarily values that are actually used in configuring or testing the cache policies. In some embodiments, one or more settings, values, thresholds, counters, and/or other values may actually be set to configure cache policies A and B in the first and second configurations. For example, if cache policy A were to use a timer, configuring cache policy A in the first configuration (i.e., as shown using 0 in the examples) could mean setting the timer to a given first value and configuring cache policy A in the second configuration (i.e., as shown using 1 in the examples) could mean setting the timer to a given second value. As another example, if cache policy A were to use a data type specifier (e.g., for prefetched data, demand fetched data, etc.), configuring cache policy A in the first configuration (i.e., as shown using 0 in the examples) may mean setting the data type specifier to a given first value and configuring cache policy A in the second configuration (i.e., as shown using 1 in the examples) may mean setting the data type specifier to a given second value.

Figure 10:
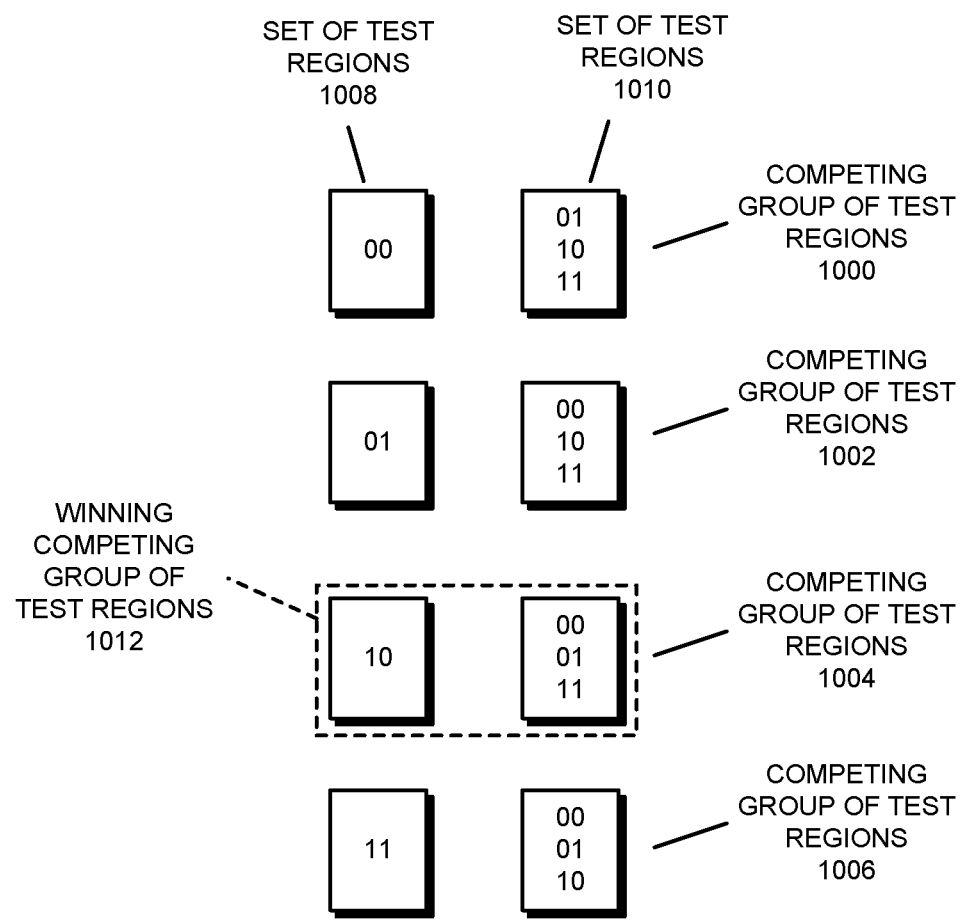
FIG. 10 presents a block diagram illustrating testing regions for one-versus-many testing in accordance with some embodiments.

The cache policy manager divides the test regions into competing groups of test regions and records performance metrics for the competing groups of test regions while performing the cache operations (step 902). For this operation, the cache policy manager divides the test regions into competing groups of test regions so that each test region is included in a respective competing group of test regions alone with the remaining test regions. In other words, the cache policy manager divides the test regions into one-versus-many competing groups so that each individual test region is separately pitted against all the other test regions in a respective competing group of test regions. FIG. 10 presents a block diagram illustrating testing regions for one-versus-many testing in accordance with some embodiments. As can be seen in FIG. 10, the four test regions are divided into four competing groups of test regions 1000-1006, with each of competing group of test regions 1000-1006 including a first set of test regions having a respective one of the test regions alone and a second set of test regions having the remaining test regions together. For example, competing group of test regions 1000 includes set of test regions 1008 with the test region in which cache policies A and B are in the first configuration versus set of test regions 1010 with the remaining test regions.

For recording performance metrics for competing groups of test regions 1000-1006, the cache policy manager records performance metrics that identify the relative performance of the configuration of cache policies A and B in the competing groups of test regions. For example, in some embodiments, the cache policy manager uses a separate saturating push-pull counter to keep track of the misses (i.e., requests for which no copy of instructions and/or data was found in the test region) for each competing group of test regions. In these embodiments, the cache policy manager starts the counter for each competing group of test regions at an initial value and, when a miss is encountered in a first set of test regions in which the lone test region is included (e.g., set of test regions 1008), increases the counter (e.g., increments, doubles/shifts, etc.), and when a miss is encountered in a second set of test regions in which the remaining test regions are included (e.g., set of test regions 1010), decreases the counter (e.g., decremented, halved/shifted, etc.). The counter for each competing group of test regions is therefore pushed/increased for events that occur for the first set of test regions in that competing group of test regions and pulled/decreased for events that occur for the second set of test regions in that competing group of test regions (up and down to saturating values such as 16 and 0, etc.). In some embodiments, the cache policy manager collects/records performance metrics for a specified amount of time (e.g., N seconds, where N is 0.5, 1, or another value), until a given number of cache operations have been performed, and/or based on one or more other time values.

In some embodiments, the amount by which the above-described counter is increased for the first set of test regions is larger than the amount that the counter is decreased for the second set of test regions. This can help to balance the effect on the counter of events occurring in the first set of test regions and the second set of test regions due to the difference in size of the sets of test regions. In other words, and using misses in competing group of test regions 1000 as an example, when misses are substantially equally distributed among the test regions (which can generally be expected), the number of misses encountered in set of test regions 1008 should be ⅓ of the number of misses encountered in set of test regions 1010. In some embodiments, therefore, the counter kept for competing group of test regions is increased 3× more when a miss is encountered in set of test regions 1008 than an amount by which the counter is decreased when a miss is encountered in set of test regions 1010 in order to balance the effects on the counter.

The cache policy manager then determines, based on the recorded performance metrics, a particular competing group of test regions that best meets a performance metric target value (step 904). For this operation, the cache policy manager compares the performance metrics for the competing groups of test regions to one another to find a performance metric that best meets a performance metric target value. For example, in some embodiments, the cache policy manager checks the above-described push-pull counters for the competing groups of test regions to determine a competing group of test regions that best meets a performance metric target such as a particular value of the push-pull counter that indicates a number of misses, etc. is lower for a given one of the competing group of test regions. As can be seen in FIG. 10, winning competing group of test regions 1012 is the competing group of test regions that best meets the performance metric target.

The cache policy manager next selects a selected configuration for at least one cache policy of the two or more cache policies from the configuration values for a specified test region from among the particular competing group of test regions (step 906). In some embodiments, the specified test region is the lone test region in the particular/winning group of test regions, such as the 10 test region in winning group of test regions 1012. For this operation, therefore, the cache policy manager next selects the selected configuration for at least one cache policy of the two or more cache policies from the configuration values for the lone test region in the particular group of test regions. The cache policy manager then causes the cache controller to use the selected configuration value when using the at least one cache policy in a main region of the cache memory (e.g., as shown in step 504 of FIG. 5).

Process for Performing Per-Region Testing

Figure 11:
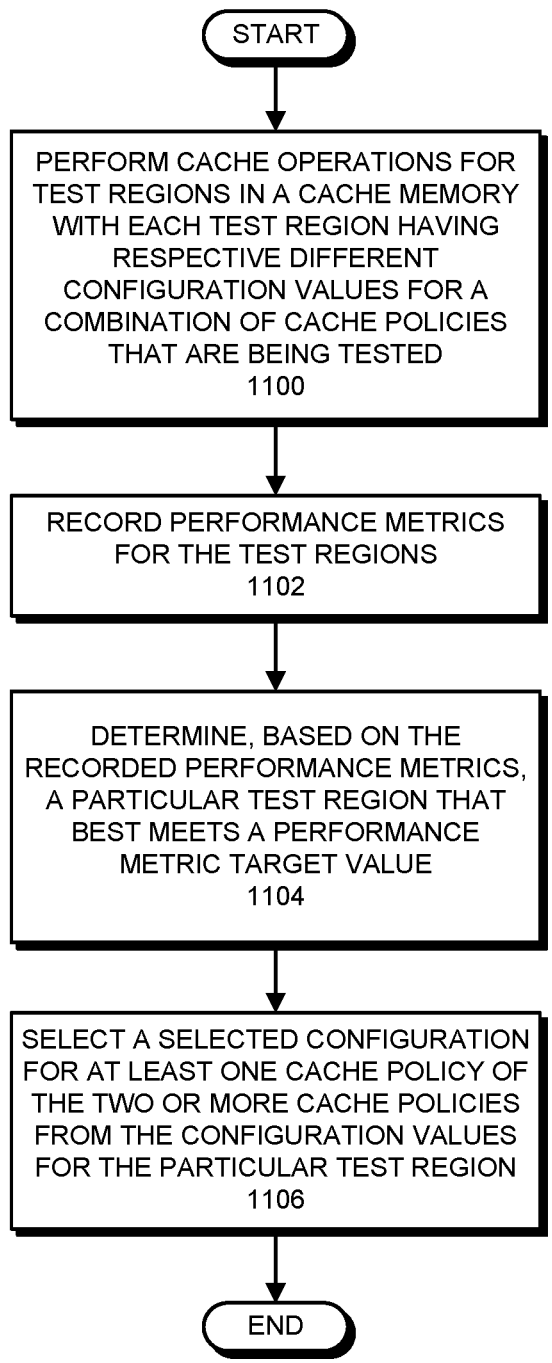
FIG. 11 presents a flowchart illustrating a process for performing per-region testing of configurations of two or more cache policies in accordance with some embodiments.

In some embodiments, a cache policy manager (e.g., cache policy manager 302) performs per-region testing of configurations of two or more cache policies. FIG. 11 presents a flowchart illustrating a process for performing per-region testing of configurations of two or more cache policies in accordance with some embodiments. Note that the operations shown in FIG. 11 are presented as a general example of operations performed by some embodiments. The operations performed by other embodiments include different operations, operations that are performed in a different order, and/or operations that are performed by different entities or functional blocks. In some embodiments, the process shown in FIG. 11 is performed as part of step 502 of FIG. 5. In these embodiments, in other words, the selected configuration value for at least one cache policy is selected using the per-region testing shown in FIG. 11.

Generally, for the per-region testing, a combination of two or more cache policies is used for performing cache operations in each of multiple test regions in a cache, with different configuration values being used for the combination of two or more cache policies in each test region. The cache policy manager collects performance metrics that represent the performance of each of the test regions. The cache policy manager next uses the performance metrics to determine a winning test region, where the "winning" test regions best meets performance metric targets (e.g., a target for number of misses, etc.). In other words, the test regions are individually pitted against each of the other test regions to find the winning test region among all of the test regions. The selected configuration value to be used for subsequent cache operations in a main region of the cache is then selected from among the configuration values for the winning test region.

For the process shown in FIG. 11, a combination of cache policies A and B (e.g., a replacement cache policy and a storage cache policy) is used as an example of a combination of cache policies being tested. In some embodiments, however, more than two cache policies are tested with the operations in FIG. 11 adjusted accordingly. In addition, for the process shown in FIG. 11, it is assumed that configuration values can only have two values (e.g., 0/1, on/off, etc.)—i.e., that the configurations can only be set in two ways or operating states. In some embodiments, however, some or all of the cache policies use at least some configuration values that have (can be set to, etc.) three or more values or use multiple configuration values, with the operations in FIG. 11 adjusted accordingly.

The process shown in FIG. 11 starts with a cache controller performing cache operations for test regions in a cache memory (e.g., cache memory 304), with each test region having different configuration values for a combination of two cache policies being tested (step 1100). For this operation, the cache controller, possibly upon being caused by (e.g., at the request of, command of, etc.) a cache policy manager (e.g., cache policy manager 302), performs cache operations in each of the test regions such as storing copies of instructions and/or data, accessing stored copies of instructions and/or data, evicting/replacing existing stored copies of instructions and/or data with incoming copies of instructions and/or data, etc. In each test region, the cache controller performs the cache operations using a given one of two configurations for each of cache policies A and B. For example, using 0 and 1 to generally represent first and second configurations of the cache policies, cache policies A and B may be configured in four test regions such as the configurations of cache policies shown in FIG. 6. In other words, in a first test region, both cache policies A and B are set to a first configuration, represented by 00, in a second test region, cache policy A is in the first configuration and cache policy B is in the second configuration, represented by 01, in a third test region, cache policy A is in the second configuration and cache policy B is in the first configuration, represented by 10, etc.

Note that "0" and "1" as used for cache policies A and B for the example in FIG. 11 and elsewhere herein are used to identify or indicate first and second configurations for cache policies A and B, but 0 and/or 1 are not necessarily values that are actually used in configuring or testing the cache policies. In some embodiments, one or more settings, values, thresholds, counters, and/or other values may actually be set to configure cache policies A and B in the first and second configurations. For example, if cache policy A were to use a timer, configuring cache policy A in the first configuration (i.e., as shown using 0 in the examples) could mean setting the timer to a given first value and configuring cache policy A in the second configuration (i.e., as shown using 1 in the examples) could mean setting the timer to a given second value. As another example, if cache policy A were to use a data type specifier (e.g., for prefetched data, demand fetched data, etc.), configuring cache policy A in the first configuration (i.e., as shown using 0 in the examples) may mean setting the data type specifier to a given first value and configuring cache policy A in the second configuration (i.e., as shown using 1 in the examples) may mean setting the data type specifier to a given second value.

The cache policy manager records performance metrics for the test regions while performing the cache operations (step 1102). For this operation, the cache policy manager records performance metrics that identify the relative performance of the configuration of cache policies A and B in each test region. For example, in some embodiments, the cache policy manager uses a separate counter to keep track of the misses (i.e., requests for which no copy of instructions and/or data was found in the test region) for each test region. In these embodiments, the cache policy manager starts the counter for each test region at zero and, when a miss is encountered in the respective test region, increases the counter for that test region (e.g., increments, doubles/shifts, etc.). When increasing the counter for any of the test regions causes the counter to reach a maximum value for the counter (e.g., a value of 15 for a four-bit counter), the cache policy manager reduces all of the counters in a specified way (e.g., divides in half/shifts, truncates, etc.) and then continues increasing the counters as described above. In some embodiments, the cache policy manager collects/records performance metrics for a specified amount of time (e.g., N seconds, where N is 0.5, 1, or another value), until a given number of cache operations have been performed, and/or based on one or more other time values.

The cache policy manager then determines, based on the recorded performance metrics, a particular test region that best meets a performance metric target value (step 1104). For this operation, the cache policy manager compares the performance metrics for the test regions to one another to find a performance metric that best meets a performance metric target value. For example, in some embodiments, the cache policy manager checks the above-described counters for the test regions to determine a test region that best meets a performance metric target such as a particular value of the respective counter that indicates a number of misses, etc. is lower for that test region.

The cache policy manager next selects a selected configuration for at least one cache policy of the two or more cache policies from the configuration values for the test region that best meets the performance metric target value (step 1106). For this operation the cache policy manager selects the selected configuration for at least one cache policy of the two or more cache policies from the configuration values for the winning test region. The cache policy manager then causes the cache controller to use the selected configuration value when using the at least one cache policy in a main region of the cache memory (e.g., as shown in step 504 of FIG. 5).

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, cache 300, cache policy manager 302, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
 a cache that includes a cache controller and cache memory; and
 a cache policy manager configured to:
  cause the cache controller to use two or more cache policies for cache operations in each of multiple test regions in the cache memory, with different configuration values for the two or more cache policies being used in each test region;
  select a selected configuration value for at least one cache policy of the two or more cache policies based on performance metrics for cache operations; and
  cause the cache controller to use the selected configuration value when using the at least one cache policy for cache operations in a main region of the cache memory.

2. The electronic device of claim 1, wherein, for selecting the selected configuration value, the cache policy manager is configured to:
 record performance metrics for competing groups of test regions while the cache controller uses the two or more cache policies for cache operations in the multiple test regions, each competing group of test regions including first and second groups of test regions in which a respective configuration value is the same for all of the test regions; and
 select the selected configuration value from among the competing groups of test regions meeting corresponding group performance metric targets.

3. The electronic device of claim 2, wherein, when recording the performance metrics, the cache policy manager is configured to:
 update counters associated with competing groups of test regions, the updating including, for each competing group of test regions:
  increasing the counter associated with that competing group of test regions when an event occurs for the first group of test regions for that competing group of test regions; and
  decreasing the counter associated with that competing group of test regions when the event occurs for the second group of test regions for that competing group of test regions.

4. The electronic device of claim 3, wherein, when selecting the selected configuration value, the cache policy manager is configured to:
 starting from a first competing group of test regions and until reaching a final competing group of test regions, for a current competing group of test regions:
  determine, based on the counter associated with the current competing group of test regions, a particular group of test regions among the first or the second groups of test regions in the current competing group of test regions that meets a performance metric target value; and
  set, as the current competing group of test regions, the particular group of test regions; and
 select the selected configuration value from among the configuration values for the final competing group of test regions.

5. The electronic device of claim 1, wherein, for selecting the selected configuration value, the cache policy manager is configured to:
 record performance metrics for competing groups of test regions while the cache controller uses the two or more cache policies for cache operations in the multiple test regions, each competing group of test regions having a first set of test regions that includes a respective one of the test regions alone and a second set of test regions that includes the remaining test regions; and
 select the selected configuration value from among the competing groups of test regions that meets a group performance metric target.

6. The electronic device of claim 5, wherein, when recording the performance metrics, the cache policy manager is configured to:
 update counters associated with the competing groups of test regions, the updating including, for each competing group of test regions:
  increasing the counter associated with that competing group of test regions when an event occurs for the one of the test regions in the first set of test regions for that competing group of test regions; and
  decreasing the counter associated with that competing group of test regions when the event occurs for any of the remaining test regions in the second set of test regions for that competing group of test regions.

7. The electronic device of claim 6, wherein, when increasing the counter associated with a given competing group of test regions, the cache policy manager is configured to:
 increase the counter in proportion to a ratio of a number of test regions in the first set of test regions and the second set of test regions for the given competing group of test regions.

8. The electronic device of claim 6, wherein, when selecting the selected configuration value, the cache policy manager is configured to:
 determine, based on the counters associated with the competing groups of test regions, a particular competing group of test regions for which the counter meets a performance metric target value;
 select the selected configuration value from among the configuration values used for the one of the test regions in the first set of test regions for the particular competing group of test regions.

9. The electronic device of claim 1, wherein, for selecting the selected configuration value, the cache policy manager is configured to:
 record performance metrics for each test region while the cache controller uses the two or more cache policies for cache operations in the multiple test regions; and
 select the selected configuration value from the test region meeting corresponding group performance metric targets.

10. The electronic device of claim 1, wherein, when using the two or more cache policies for cache operations, the cache controller is configured to:
 in accordance with each of two separate cache policies, control at least one of:
  storage of data in cache blocks in the test regions of the cache memory;
  accesses of data in cache blocks in the test regions of the cache memory; and
  eviction of data in cache blocks in the test regions of the cache memory.

11. The electronic device of claim 1, wherein, when using the two or more cache policies for cache operations, the cache controller is configured to use one or more of:

a timing policy that dictates how long data of particular types is retained in cache blocks in the cache memory;

a data copy policy that dictates whether copies of data of particular types are to be stored in cache blocks in the cache memory;

a replacement policy that dictates conditions under which data is to be evicted from the cache memory to clear space for storing other data in the cache memory; and a modified data write back policy for data in cache blocks in the cache memory.

12. The electronic device of claim 1, wherein:

the multiple test regions in the cache memory are of first size in bytes; and the main region of the cache memory is of a second size in bytes, the second size being one or more orders of magnitude larger than the first size.

13. A method for performing cache operations in a cache memory in an electronic device that includes the cache memory, a cache controller and cache memory in the cache memory, and a cache policy manager, the method comprising:

causing, by the cache policy manager, the cache controller to use two or more cache policies for cache operations in each of multiple test regions in the cache memory, with different configuration values for the two or more cache policies being used in each test region;

selecting, by the cache policy manager, a selected configuration value for at least one cache policy of the two or more cache policies based on performance metrics for cache operations; and causing, by the cache policy manager, the cache controller to use the selected configuration value when using the at least one cache policy for cache operations in a main region of the cache memory.

14. The method of claim 13, wherein selecting the selected configuration value comprises:

recording, by the cache policy manager, performance metrics for competing groups of test regions while the cache controller uses the two or more cache policies for cache operations in the multiple test regions, each competing group of test regions including first and second groups of test regions that each have a match for a given configuration value; and selecting, by the cache policy manager, the selected configuration value from among the competing groups of test regions meeting corresponding group performance metric targets.

15. The method of claim 14, wherein recording the performance metrics comprises:

updating, by the cache policy manager, counters associated with competing groups of test regions, the updating including, for each competing group of test regions:

increasing the counter associated with that competing group of test regions when an event occurs for the first group of test regions for that competing group of test regions; and decreasing the counter associated with that competing group of test regions when the event occurs for the second group of test regions for that competing group of test regions.

16. The method of claim 15, wherein selecting the selected configuration value comprises:

starting from a first competing group of test regions and until reaching a final competing group of test regions, for a current competing group of test regions:

determining, by the cache policy manager, based on the counter associated with the current competing group of test regions, a particular group of test regions among the first or the second groups of test regions in the current competing group of test regions that meets a performance metric target value; and setting, by the cache policy manager, as the current competing group of test regions, the particular group of test regions; and selecting, by the cache policy manager, the selected configuration value from among the configuration values for the final competing group of test regions.

17. The method of claim 13, wherein selecting the selected configuration value comprises:

recording, by the cache policy manager, performance metrics for competing groups of test regions while the cache controller uses the two or more cache policies for cache operations in the multiple test regions, each competing group of test regions having a first set of test regions that includes a respective one of the test regions alone and a second set of test regions that includes the remaining test regions; and selecting, by the cache policy manager, the selected configuration value from among the competing groups of test regions that meets a group performance metric target.

18. The method of claim 17, wherein recording the performance metrics comprises:

updating, by the cache policy manager, counters associated with the competing groups of test regions, the updating including, for each competing group of test regions:

increasing the counter associated with that competing group of test regions when an event occurs for the one of the test regions in the first set of test regions for that competing group of test regions; and decreasing the counter associated with that competing group of test regions when the event occurs for any of the remaining test regions in the second set of test regions for that competing group of test regions.

19. The method of claim 18, wherein increasing the counter associated with a given competing group of test regions comprises:

increasing, by the cache policy manager, the counter in proportion to a ratio of a number of test regions in the first set of test regions and the second set of test regions for the given competing group of test regions.

20. The method of claim 18, wherein selecting the selected configuration value comprises:

determining, by the cache policy manager, based on the counters associated with the competing groups of test regions, a particular competing group of test regions for which the counter meets a performance metric target value;

selecting, by the cache policy manager, the selected configuration value from among the configuration values used for the one of the test regions in the first set of test regions for the particular competing group of test regions.

21. The method of claim 13, wherein selecting the selected configuration value comprises:

recording, by the cache policy manager, performance metrics for each test region while the cache controller uses the two or more cache policies for cache operations in the multiple test regions; and selecting, by the cache policy manager, the selected configuration value from the test region meeting corresponding group performance metric targets.

22. The method of claim 13, wherein using the two or more cache policies for cache operations comprises:
in accordance with each of two separate cache policies, controlling at least one of:
storage of data in cache blocks in the test regions of the cache memory;
accesses of data in cache blocks in the test regions of the cache memory; and
eviction of data in cache blocks in the test regions of the cache memory.

23. The method of claim 13, wherein:
the multiple test regions in the cache memory are of first size in bytes; and
the main region of the cache memory is of a second size in bytes, the second size being one or more orders of magnitude larger than the first size.

24. A method of operating a processor, comprising:
using to two or more cache policies for cache operations in each of multiple test regions in a cache memory with different configuration values for the two or more cache policies being used in each test region, the two or more cache policies being configured differently in each test region;
based on performance metrics for cache operations while using the different configuration values for the two or more cache policies in the test regions, selecting a configuration value for the at least one cache policy, the configuration value having been in use in a given one of the test regions having performance metrics that meet a performance metric target; and
using the selected configuration value when using the at least one cache policy in a main region of the cache memory.

* * * * *